United States Patent
Lewis et al.

(10) Patent No.: US 12,181,423 B1
(45) Date of Patent: Dec. 31, 2024

(54) SECONDARY IMAGE REMOVAL USING HIGH RESOLUTION X-RAY TRANSMISSION SOURCES

(71) Applicant: Sigray, Inc., Concord, CA (US)

(72) Inventors: Sylvia Jia Yun Lewis, San Francisco, CA (US); Sheraz Gul, San Ramon, CA (US); Wenbing Yun, Walnut Creek, CA (US)

(73) Assignee: Sigray, Inc., Concord, CA (US)

( * ) Notice: Subject to any disclaimer, the term of this patent is extended or adjusted under 35 U.S.C. 154(b) by 0 days.

(21) Appl. No.: 18/406,851

(22) Filed: Jan. 8, 2024

Related U.S. Application Data

(60) Provisional application No. 63/581,225, filed on Sep. 7, 2023.

(51) Int. Cl.
  *G01N 23/00* (2006.01)
  *G01N 23/04* (2018.01)
  *G01N 23/083* (2018.01)

(52) U.S. Cl.
  CPC ........... *G01N 23/04* (2013.01); *G01N 23/083* (2013.01); *G01N 2223/20* (2013.01);
  (Continued)

(58) Field of Classification Search
  CPC .................................................. G01N 23/083
  See application file for complete search history.

(56) References Cited

U.S. PATENT DOCUMENTS

| 1,203,495 A | 10/1916 | Coolidge |
| 1,211,092 A | 1/1917 | Coolidge |

(Continued)

FOREIGN PATENT DOCUMENTS

| CN | 1656373 A | 8/2005 |
| CN | 1829910 A | 9/2006 |

(Continued)

OTHER PUBLICATIONS

"High performance benchtop EDXRF spectrometer with Windows®® software," published by: Rigaku Corp., Tokyo, Japan; 2017.

(Continued)

*Primary Examiner* — Dani Fox
(74) *Attorney, Agent, or Firm* — Knobbe, Martens, Olson & Bear, LLP

(57) ABSTRACT

An apparatus includes a transmission x-ray source having a window including a target layer of at least one x-ray generating material and an internal aperture configured to allow a first portion of an electron beam to bombard the target layer and to block a second portion of the electron beam from bombarding the target. The first portion of the electron beam has a full-width-at-half-maximum width at the target less than or equal to 1 micron. The window is spaced from the internal aperture by a first distance $D_1$. The apparatus further includes an x-ray detector system having a scintillator, an optical assembly, at least one image sensor configured to receive and respond to visible light by generating electrical signals, and a motorized stage configured to controllably adjust a position of the scintillator such that the scintillator is spaced from the window by a second distance $D_2$, wherein $D_2^2/(D_1+D_2)^2$ is less than 0.2.

25 Claims, 8 Drawing Sheets

(52) U.S. Cl.
CPC .................. *G01N 2223/317* (2013.01); *G01N 2223/3306* (2013.01); *G01N 2223/505* (2013.01)

(56) References Cited

U.S. PATENT DOCUMENTS

| | | |
|---|---|---|
| 1,215,116 A | 2/1917 | Coolidge |
| 1,328,495 A | 1/1920 | Coolidge |
| 1,355,126 A | 10/1920 | Coolidge |
| 1,790,073 A | 1/1931 | Pohl |
| 1,917,099 A | 7/1933 | Coolidge |
| 1,946,312 A | 2/1934 | Coolidge |
| 2,926,270 A | 2/1960 | Zunick |
| 3,795,832 A | 3/1974 | Holland |
| 3,894,239 A | 7/1975 | Braun |
| 4,165,472 A | 8/1979 | Wittry |
| 4,169,228 A | 9/1979 | Briska et al. |
| 4,192,994 A | 3/1980 | Kastner |
| 4,227,112 A | 10/1980 | Waugh et al. |
| 4,266,138 A | 5/1981 | Nelson et al. |
| 4,523,327 A | 6/1985 | Eversole |
| 4,573,186 A | 2/1986 | Reinhold |
| 4,642,811 A | 2/1987 | Georgopoulos |
| 4,945,552 A | 7/1990 | Ueda |
| 4,951,304 A | 8/1990 | Piestrup et al. |
| 4,972,449 A | 11/1990 | Upadhya et al. |
| 5,132,997 A | 7/1992 | Kojima |
| 5,148,462 A | 9/1992 | Spitsyn et al. |
| 5,173,928 A | 12/1992 | Momose et al. |
| 5,204,887 A | 4/1993 | Hayashida et al. |
| 5,220,591 A | 6/1993 | Ohsugi et al. |
| 5,249,216 A | 9/1993 | Ohsugi et al. |
| 5,280,176 A | 1/1994 | Jach et al. |
| 5,371,774 A | 12/1994 | Cerrina |
| 5,416,820 A | 5/1995 | Weil et al. |
| 5,602,899 A | 2/1997 | Larson |
| 5,629,969 A | 5/1997 | Koshishiba |
| 5,657,365 A | 8/1997 | Yamamoto et al. |
| 5,684,857 A | 11/1997 | De Bokx |
| 5,729,583 A | 3/1998 | Tang et al. |
| 5,737,387 A | 4/1998 | Smither |
| 5,778,039 A | 7/1998 | Hossain |
| 5,790,628 A | 8/1998 | Ishida |
| 5,812,629 A | 9/1998 | Clauser |
| 5,825,848 A | 10/1998 | Virshup et al. |
| 5,832,052 A | 11/1998 | Hirose et al. |
| 5,857,008 A | 1/1999 | Reinhold |
| 5,878,110 A | 3/1999 | Yamamoto et al. |
| 5,912,940 A | 6/1999 | O'Hara |
| 5,978,448 A | 11/1999 | Bristol |
| 6,108,398 A | 8/2000 | Mazor et al. |
| 6,118,853 A | 9/2000 | Hansen et al. |
| 6,125,167 A | 9/2000 | Morgan |
| 6,181,773 B1 | 1/2001 | Lee et al. |
| 6,185,277 B1 | 2/2001 | Harding |
| 6,195,410 B1 | 2/2001 | Cash, Jr. |
| 6,226,347 B1 | 5/2001 | Golenhofen |
| 6,307,916 B1 | 10/2001 | Rogers et al. |
| 6,377,660 B1 | 4/2002 | Ukita et al. |
| 6,381,303 B1 | 4/2002 | Vu et al. |
| 6,430,254 B2 | 8/2002 | Wilkins |
| 6,430,260 B1 | 8/2002 | Snyder |
| 6,442,231 B1 | 8/2002 | O'Hara |
| 6,456,688 B1 | 9/2002 | Taguchi et al. |
| 6,463,123 B1 | 10/2002 | Korenev |
| 6,487,272 B1 | 11/2002 | Kutsuzawa |
| 6,504,902 B2 | 1/2003 | Iwasaki et al. |
| 6,512,814 B2 | 1/2003 | Yokhin et al. |
| 6,553,096 B1 | 4/2003 | Zhou et al. |
| 6,560,313 B1 | 5/2003 | Harding et al. |
| 6,560,315 B1 | 5/2003 | Price et al. |
| 6,577,704 B1 | 6/2003 | Holz |
| 6,611,577 B1 | 8/2003 | Yamagami |
| 6,639,968 B2 | 10/2003 | Yokhin et al. |
| 6,707,883 B1 | 3/2004 | Tiearney et al. |
| 6,711,234 B1 | 3/2004 | Loxley et al. |
| 6,763,086 B2 | 7/2004 | Platonov |
| 6,829,327 B1 | 12/2004 | Chen |
| 6,850,598 B1 | 2/2005 | Fryda et al. |
| 6,891,627 B1 | 5/2005 | Levy et al. |
| 6,895,071 B2 | 5/2005 | Yokhin et al. |
| 6,914,723 B2 | 7/2005 | Yun et al. |
| 6,934,359 B2 | 8/2005 | Chen |
| 6,947,522 B2 | 9/2005 | Wilson et al. |
| 6,975,703 B2 | 12/2005 | Wilson et al. |
| 7,003,077 B2 | 2/2006 | Jen et al. |
| 7,006,596 B1 | 2/2006 | Janik |
| 7,023,950 B1 | 4/2006 | Annis |
| 7,023,955 B2 | 4/2006 | Chen et al. |
| 7,075,073 B1 | 7/2006 | Janik et al. |
| 7,079,625 B2 | 7/2006 | Lenz |
| 7,095,822 B1 | 8/2006 | Yun |
| 7,119,953 B2 | 10/2006 | Yun et al. |
| 7,120,228 B2 | 10/2006 | Yokhin et al. |
| 7,180,979 B2 | 2/2007 | Momose |
| 7,180,981 B2 | 2/2007 | Wang |
| 7,183,547 B2 | 2/2007 | Yun et al. |
| 7,187,751 B2 | 3/2007 | Kawahara et al. |
| 7,215,736 B1 | 5/2007 | Wang et al. |
| 7,215,741 B2 | 5/2007 | Ukita et al. |
| 7,218,700 B2 | 5/2007 | Huber et al. |
| 7,218,703 B2 | 5/2007 | Yada et al. |
| 7,221,731 B2 | 5/2007 | Yada et al. |
| 7,245,696 B2 | 7/2007 | Yun et al. |
| 7,258,485 B2 | 8/2007 | Nakano et al. |
| 7,268,945 B2 | 9/2007 | Yun et al. |
| 7,330,533 B2 | 2/2008 | Sampayon |
| 7,346,148 B2 | 3/2008 | Ukita |
| 7,349,525 B2 | 3/2008 | Morton |
| 7,359,487 B1 | 4/2008 | Newcome |
| 7,382,864 B2 | 6/2008 | Hebert et al. |
| 7,388,942 B2 | 6/2008 | Wang et al. |
| 7,394,890 B1 | 7/2008 | Wang et al. |
| 7,400,704 B1 | 7/2008 | Yun et al. |
| 7,406,151 B1 | 7/2008 | Yun |
| 7,414,787 B2 | 8/2008 | Yun et al. |
| 7,443,953 B1 | 10/2008 | Yun et al. |
| 7,443,958 B2 | 10/2008 | Harding |
| 7,453,560 B2 | 11/2008 | Miyake |
| 7,463,712 B2 | 12/2008 | Zhu et al. |
| 7,486,770 B2 | 2/2009 | Baumann |
| 7,492,871 B2 | 2/2009 | Popescu |
| 7,499,521 B2 | 3/2009 | Wang et al. |
| 7,515,684 B2 | 4/2009 | Gibson et al. |
| 7,522,698 B2 | 4/2009 | Popescu |
| 7,522,707 B2 | 4/2009 | Steinlage et al. |
| 7,522,708 B2 | 4/2009 | Heismann |
| 7,529,343 B2 | 5/2009 | Safai et al. |
| 7,532,704 B2 | 5/2009 | Hempel |
| 7,551,719 B2 | 6/2009 | Yokhin et al. |
| 7,551,722 B2 | 6/2009 | Ohshima et al. |
| 7,561,662 B2 | 7/2009 | Wang et al. |
| 7,564,941 B2 | 7/2009 | Baumann |
| 7,601,399 B2 | 10/2009 | Barnola et al. |
| 7,639,786 B2 | 12/2009 | Baumann |
| 7,646,843 B2 | 1/2010 | Popescu et al. |
| 7,653,177 B2 | 1/2010 | Baumann et al. |
| 7,672,433 B2 | 3/2010 | Zhong et al. |
| 7,680,243 B2 | 3/2010 | Yokhin et al. |
| 7,787,588 B1 | 8/2010 | Yun et al. |
| 7,796,725 B1 | 9/2010 | Yun et al. |
| 7,796,726 B1 | 9/2010 | Gendreau et al. |
| 7,809,113 B2 | 10/2010 | Aoki et al. |
| 7,813,475 B1 | 10/2010 | Wu et al. |
| 7,817,777 B2 | 10/2010 | Baumann et al. |
| 7,848,483 B2 | 12/2010 | Platonov |
| 7,864,922 B2 | 1/2011 | Kawabe |
| 7,873,146 B2 | 1/2011 | Okunuki et al. |
| 7,876,883 B2 | 1/2011 | O'Hara |
| 7,889,838 B2 | 2/2011 | David et al. |
| 7,889,844 B2 | 2/2011 | Okunuki et al. |
| 7,899,154 B2 | 3/2011 | Chen et al. |
| 7,920,676 B2 | 4/2011 | Yun et al. |
| 7,924,973 B2 | 4/2011 | Kottler et al. |

(56) References Cited

U.S. PATENT DOCUMENTS

| | | |
|---|---|---|
| 7,929,667 B1 | 4/2011 | Zhuang et al. |
| 7,945,018 B2 | 5/2011 | Heismann |
| 7,949,092 B2 | 5/2011 | Brons |
| 7,949,095 B2 | 5/2011 | Ning |
| 7,974,379 B1 | 7/2011 | Case et al. |
| 7,983,381 B2 | 7/2011 | David et al. |
| 7,991,120 B2 | 8/2011 | Okunuki et al. |
| 8,005,185 B2 | 8/2011 | Popescu |
| 8,009,796 B2 | 8/2011 | Popescu |
| 8,009,797 B2 | 8/2011 | Ouchi |
| 8,041,004 B2 | 10/2011 | David |
| 8,036,341 B2 | 11/2011 | Lee |
| 8,058,621 B2 | 11/2011 | Kommareddy |
| 8,068,579 B1 | 11/2011 | Yun et al. |
| 8,073,099 B2 | 12/2011 | Niu et al. |
| 8,094,784 B2 | 1/2012 | Morton |
| 8,139,711 B2 | 3/2012 | Takahashi |
| 8,139,716 B2 | 3/2012 | Okunuki et al. |
| 8,165,270 B2 | 4/2012 | David et al. |
| 8,184,771 B2 | 5/2012 | Murakoshi |
| 8,208,603 B2 | 6/2012 | Sato |
| 8,233,587 B2 | 7/2012 | Sato |
| 8,243,879 B2 | 8/2012 | Itoh et al. |
| 8,243,884 B2 | 8/2012 | Rödhammer et al. |
| 8,306,183 B2 | 11/2012 | Koehler |
| 8,306,184 B2 | 11/2012 | Chang et al. |
| 8,331,534 B2 | 12/2012 | Silver |
| 8,351,570 B2 | 1/2013 | Nakamura |
| 8,353,628 B1 | 1/2013 | Yun et al. |
| 8,360,640 B2 | 1/2013 | Reinhold |
| 8,374,309 B2 | 2/2013 | Donath |
| 8,406,378 B2 | 3/2013 | Wang et al. |
| 8,416,920 B2 | 4/2013 | Okumura et al. |
| 8,451,975 B2 | 5/2013 | Tada |
| 8,422,637 B2 | 6/2013 | Okunuki et al. |
| 8,509,386 B2 | 8/2013 | Lee et al. |
| 8,513,603 B1 | 8/2013 | Lederman et al. |
| 8,553,843 B2 | 10/2013 | Drory |
| 8,559,594 B2 | 10/2013 | Ouchi |
| 8,559,597 B2 | 10/2013 | Chen et al. |
| 8,565,371 B2 | 10/2013 | Bredno |
| 8,588,372 B2 | 11/2013 | Zou et al. |
| 8,591,108 B2 | 11/2013 | Tada |
| 8,602,648 B1 | 12/2013 | Jacobsen et al. |
| 8,632,247 B2 | 1/2014 | Ishii |
| 8,644,451 B2 | 2/2014 | Aoki et al. |
| 8,666,024 B2 | 3/2014 | Okunuki et al. |
| 8,699,667 B2 | 4/2014 | Steinlage et al. |
| 8,755,487 B2 | 6/2014 | Kaneko |
| 8,767,915 B2 | 7/2014 | Stutman |
| 8,767,916 B2 | 7/2014 | Hashimoto |
| 8,781,069 B2 | 7/2014 | Murakoshi |
| 8,824,629 B2 | 9/2014 | Ishii |
| 8,831,179 B2 | 9/2014 | Adler et al. |
| 8,837,680 B2 | 9/2014 | Tsujii |
| 8,855,265 B2 | 10/2014 | Engel |
| 8,859,977 B2 | 10/2014 | Kondoh |
| 8,861,682 B2 | 10/2014 | Okunuki et al. |
| 8,908,824 B2 | 12/2014 | Kondoh |
| 8,972,191 B2 | 3/2015 | Stampanoni et al. |
| 8,989,351 B2 | 3/2015 | Vogtmeier et al. |
| 8,989,474 B2 | 3/2015 | Kido et al. |
| 8,995,622 B2 | 3/2015 | Adler et al. |
| 9,001,967 B2 | 4/2015 | Baturin |
| 9,008,278 B2 | 4/2015 | Lee et al. |
| 9,016,943 B2 | 4/2015 | Jacobsen et al. |
| 9,020,101 B2 | 4/2015 | Omote et al. |
| 9,025,725 B2 | 5/2015 | Kiyohara et al. |
| 9,031,201 B2 | 5/2015 | Sato |
| 9,036,773 B2 | 5/2015 | David et al. |
| 9,063,055 B2 | 6/2015 | Ouchi |
| 9,086,536 B2 | 7/2015 | Pang et al. |
| 9,129,715 B2 | 9/2015 | Adler et al. |
| 9,222,899 B2 | 12/2015 | Yamaguchi |
| 9,230,703 B2 | 1/2016 | Mohr et al. |
| 9,234,856 B2 | 1/2016 | Mukaide |
| 9,251,995 B2 | 2/2016 | Ogura |
| 9,257,254 B2 | 2/2016 | Ogura et al. |
| 9,263,225 B2 | 2/2016 | Morton |
| 9,281,158 B2 | 3/2016 | Ogura |
| 9,291,578 B2 | 3/2016 | Adler |
| 9,329,141 B2 | 5/2016 | Stutman |
| 9,357,975 B2 | 6/2016 | Baturin |
| 9,362,081 B2 | 6/2016 | Bleuet |
| 9,390,881 B2 | 7/2016 | Yun et al. |
| 9,412,552 B2 | 8/2016 | Aoki et al. |
| 9,439,613 B2 | 9/2016 | Stutman |
| 9,448,190 B2 | 9/2016 | Yun et al. |
| 9,449,780 B2 | 9/2016 | Chen |
| 9,449,781 B2 | 9/2016 | Yun et al. |
| 9,453,803 B2 | 9/2016 | Radicke |
| 9,480,447 B2 | 11/2016 | Mohr et al. |
| 9,486,175 B2 | 11/2016 | Fredenberg et al. |
| 9,494,534 B2 | 11/2016 | Baturin |
| 9,502,204 B2 | 11/2016 | Ikarashi |
| 9,520,260 B2 | 12/2016 | Hesselink et al. |
| 9,524,846 B2 | 12/2016 | Sato et al. |
| 9,532,760 B2 | 1/2017 | Anton et al. |
| 9,543,109 B2 | 1/2017 | Yun et al. |
| 9,551,677 B2 | 1/2017 | Mazor et al. |
| 9,557,280 B2 | 1/2017 | Pfeiffer et al. |
| 9,564,284 B2 | 2/2017 | Gerzoskovitz |
| 9,570,264 B2 | 2/2017 | Ogura et al. |
| 9,570,265 B1 | 2/2017 | Yun et al. |
| 9,588,066 B2 | 3/2017 | Pois et al. |
| 9,594,036 B2 | 3/2017 | Yun et al. |
| 9,595,415 B2 | 3/2017 | Ogura |
| 9,632,040 B2 | 4/2017 | Stutman |
| 9,700,267 B2 | 7/2017 | Baturin et al. |
| 9,715,989 B2 | 7/2017 | Dalakos et al. |
| 9,719,947 B2 | 8/2017 | Yun et al. |
| 9,748,012 B2 | 8/2017 | Yokoyama |
| 9,757,081 B2 | 9/2017 | Proksa |
| 9,761,021 B2 | 9/2017 | Koehler |
| 9,770,215 B2 | 9/2017 | Souchay et al. |
| 9,778,213 B2 | 10/2017 | Bakeman et al. |
| 9,823,203 B2 | 11/2017 | Yun et al. |
| 9,826,949 B2 | 11/2017 | Ning |
| 9,861,330 B2 | 1/2018 | Rossl |
| 9,874,531 B2 | 1/2018 | Yun et al. |
| 9,881,710 B2 | 1/2018 | Roessl |
| 9,916,655 B2 | 3/2018 | Sampanoni |
| 9,934,930 B2 | 4/2018 | Parker et al. |
| 10,014,148 B2 | 7/2018 | Tang et al. |
| 10,020,158 B2 | 7/2018 | Yamada |
| 10,028,716 B2 | 7/2018 | Rossl |
| 10,045,753 B2 | 8/2018 | Teshima |
| 10,068,740 B2 | 9/2018 | Gupta |
| 10,074,451 B2 | 9/2018 | Kottler et al. |
| 10,076,297 B2 | 9/2018 | Bauer |
| 10,085,701 B2 | 10/2018 | Hoshino |
| 10,105,112 B2 | 10/2018 | Utsumi |
| 10,115,557 B2 | 10/2018 | Ishii |
| 10,141,081 B2 | 11/2018 | Preusche |
| 10,151,713 B2 | 12/2018 | Wu et al. |
| 10,153,061 B2 | 12/2018 | Yokoyama |
| 10,153,062 B2 | 12/2018 | Gall et al. |
| 10,217,596 B2 | 2/2019 | Liang et al. |
| 10,247,683 B2 | 4/2019 | Yun et al. |
| 10,264,659 B1 | 4/2019 | Miller et al. |
| 10,267,752 B2 | 4/2019 | Zhang et al. |
| 10,267,753 B2 | 4/2019 | Zhang et al. |
| 10,269,528 B2 | 4/2019 | Yun et al. |
| 10,295,485 B2 | 5/2019 | Yun et al. |
| 10,297,359 B2 | 5/2019 | Yun et al. |
| 10,304,580 B2 | 5/2019 | Yun et al. |
| 10,349,908 B2 | 7/2019 | Yun et al. |
| 10,352,695 B2 | 7/2019 | Dziura et al. |
| 10,352,880 B2 | 7/2019 | Yun et al. |
| 10,366,860 B2 | 7/2019 | Parker et al. |
| 10,401,309 B2 | 9/2019 | Yun et al. |
| 10,416,099 B2 | 9/2019 | Yun et al. |
| 10,466,185 B2 | 11/2019 | Yun et al. |
| 10,473,598 B2 | 11/2019 | Ogata et al. |

(56) References Cited

U.S. PATENT DOCUMENTS

| | | |
|---|---|---|
| 10,485,492 B2 | 11/2019 | Koehler et al. |
| 10,514,345 B2 | 12/2019 | Ogata et al. |
| 10,514,346 B2 | 12/2019 | Sako |
| 10,568,588 B2 | 2/2020 | Koehler et al. |
| 10,578,566 B2 | 3/2020 | Yun et al. |
| 10,634,628 B2 | 4/2020 | Kasper et al. |
| 10,653,376 B2 | 5/2020 | Yun et al. |
| 10,658,145 B2 | 5/2020 | Yun et al. |
| 10,697,902 B2 | 6/2020 | Sharma et al. |
| 10,743,396 B1 | 8/2020 | Kawase |
| 10,782,252 B2 | 9/2020 | Gateshki et al. |
| 10,794,845 B2 | 10/2020 | Filsinger |
| 10,841,515 B1 | 11/2020 | Tsujino |
| 10,847,336 B2 | 11/2020 | Durst et al. |
| 10,895,541 B2 | 1/2021 | Shchegrov et al. |
| 10,962,491 B2 | 3/2021 | Yun et al. |
| 10,976,270 B2 | 4/2021 | Wormington |
| 10,989,819 B2 | 4/2021 | Wieczorek et al. |
| 11,054,375 B2 | 6/2021 | Seidler et al. |
| 11,175,243 B1 | 11/2021 | Yun et al. |
| 11,215,572 B2 | 1/2022 | Yun et al. |
| 11,549,895 B2 | 1/2023 | Yun et al. |
| 11,686,692 B2 | 6/2023 | Vine et al. |
| 2001/0046276 A1 | 11/2001 | Schneider et al. |
| 2002/0064253 A1 | 5/2002 | Gutman |
| 2002/0085676 A1 | 7/2002 | Snyder |
| 2002/0150208 A1 | 10/2002 | Yohkin et al. |
| 2003/0021377 A1 | 1/2003 | Turner et al. |
| 2003/0142790 A1 | 1/2003 | Zhou et al. |
| 2003/0072413 A1 | 4/2003 | Yokhin et al. |
| 2003/0142781 A1 | 7/2003 | Kawahara |
| 2003/0223536 A1 | 12/2003 | Yun et al. |
| 2004/0028186 A1 | 2/2004 | Yokhin et al. |
| 2004/0047446 A1 | 3/2004 | Platonov |
| 2004/0076260 A1 | 4/2004 | Charles, Jr. |
| 2004/0120463 A1 | 6/2004 | Wilson et al. |
| 2004/0140432 A1 | 7/2004 | Maldonado et al. |
| 2005/0074094 A1 | 4/2005 | Jen et al. |
| 2005/0087699 A1 | 4/2005 | Miyake |
| 2005/0123097 A1 | 6/2005 | Wang |
| 2005/0201520 A1 | 9/2005 | Smith et al. |
| 2005/0265517 A1 | 12/2005 | Gary |
| 2005/0282300 A1 | 12/2005 | Yun et al. |
| 2005/0286680 A1 | 12/2005 | Momose |
| 2006/0062350 A1 | 3/2006 | Yokhin |
| 2006/0088139 A1 | 4/2006 | Nankano et al. |
| 2006/0169893 A1 | 8/2006 | Lee et al. |
| 2006/0182322 A1 | 8/2006 | Bernhardt et al. |
| 2006/0233309 A1 | 10/2006 | Kutzner et al. |
| 2007/0071174 A1 | 3/2007 | Hebert et al. |
| 2007/0108387 A1 | 5/2007 | Yun et al. |
| 2007/0110217 A1 | 5/2007 | Ukita |
| 2007/0140420 A1 | 6/2007 | Radley et al. |
| 2007/0183563 A1 | 8/2007 | Baumann |
| 2007/0183579 A1 | 8/2007 | Baumann et al. |
| 2007/0189449 A1 | 8/2007 | Baumann |
| 2007/0248215 A1 | 10/2007 | Ohshima et al. |
| 2007/0285643 A1 | 12/2007 | Wedowski et al. |
| 2008/0043908 A1 | 2/2008 | Teramoto et al. |
| 2008/0084966 A1 | 4/2008 | Aoki et al. |
| 2008/0089484 A1 | 4/2008 | Reinhold |
| 2008/0137812 A1 | 6/2008 | Frontera et al. |
| 2008/0159475 A1 | 7/2008 | Mazor et al. |
| 2008/0170662 A1 | 7/2008 | Reinhold |
| 2008/0170668 A1 | 7/2008 | Kruit et al. |
| 2008/0181363 A1 | 7/2008 | Fenter et al. |
| 2008/0273662 A1 | 11/2008 | Yun |
| 2009/0052619 A1 | 2/2009 | Endoh |
| 2009/0092227 A1 | 4/2009 | David |
| 2009/0154640 A1 | 6/2009 | Baumann et al. |
| 2009/0316857 A1 | 12/2009 | David et al. |
| 2009/0316860 A1 | 12/2009 | Okunuki et al. |
| 2010/0027739 A1 | 2/2010 | Lantz et al. |
| 2010/0040202 A1 | 2/2010 | Lee |
| 2010/0061508 A1 | 3/2010 | Takahashi |
| 2010/0091947 A1 | 4/2010 | Niu |
| 2010/0141151 A1 | 6/2010 | Reinhold |
| 2010/0201240 A1 | 8/2010 | Heinke et al. |
| 2010/0246765 A1 | 9/2010 | Murakoshi |
| 2010/0260315 A1 | 10/2010 | Sato et al. |
| 2010/0284513 A1 | 11/2010 | Kawabe |
| 2010/0310041 A1 | 12/2010 | Adams et al. |
| 2010/0329532 A1 | 12/2010 | Masuda et al. |
| 2011/0026680 A1 | 2/2011 | Sato |
| 2011/0038455 A1 | 2/2011 | Silver et al. |
| 2011/0058655 A1 | 3/2011 | Okumura et al. |
| 2011/0064202 A1 | 3/2011 | Thran et al. |
| 2011/0085641 A1 | 4/2011 | Okunuki et al. |
| 2011/0135066 A1 | 6/2011 | Behling |
| 2011/0142204 A1 | 6/2011 | Zou et al. |
| 2011/0235781 A1 | 9/2011 | Aoki et al. |
| 2011/0243302 A1 | 10/2011 | Murakoshi |
| 2011/0261164 A1 | 10/2011 | Olesen et al. |
| 2011/0268252 A1 | 11/2011 | Ozawa et al. |
| 2012/0041679 A1 | 2/2012 | Stampanoni |
| 2012/0057669 A1 | 3/2012 | Vogtmeier et al. |
| 2012/0163547 A1 | 6/2012 | Lee et al. |
| 2012/0224670 A1 | 9/2012 | Kiyohara et al. |
| 2012/0228475 A1 | 9/2012 | Pang et al. |
| 2012/0269323 A1 | 10/2012 | Adler et al. |
| 2012/0269324 A1 | 10/2012 | Adler |
| 2012/0269325 A1 | 10/2012 | Adler et al. |
| 2012/0269326 A1 | 10/2012 | Adler et al. |
| 2013/0011040 A1 | 1/2013 | Kido et al. |
| 2013/0039460 A1 | 2/2013 | Levy |
| 2013/0108012 A1 | 5/2013 | Sato |
| 2013/0108022 A1 | 5/2013 | Kugland et al. |
| 2013/0195246 A1 | 8/2013 | Tamura et al. |
| 2013/0202084 A1 | 8/2013 | Piorek et al. |
| 2013/0223594 A1 | 8/2013 | Sprong et al. |
| 2013/0235976 A1 | 9/2013 | Jeong et al. |
| 2013/0251100 A1 | 9/2013 | Sasaki et al. |
| 2013/0259207 A1 | 10/2013 | Omote et al. |
| 2013/0308112 A1 | 11/2013 | Clube et al. |
| 2013/0308754 A1 | 11/2013 | Yamazaki et al. |
| 2014/0023973 A1 | 1/2014 | Marconi et al. |
| 2014/0029729 A1 | 1/2014 | Kucharczyk |
| 2014/0037052 A1 | 2/2014 | Adler |
| 2014/0064445 A1 | 3/2014 | Adler |
| 2014/0072102 A1 | 3/2014 | Bluet |
| 2014/0072104 A1 | 3/2014 | Jacobsen et al. |
| 2014/0079188 A1 | 3/2014 | Hesselink et al. |
| 2014/0105353 A1 | 4/2014 | Pfeiffer et al. |
| 2014/0105363 A1 | 4/2014 | Chen et al. |
| 2014/0112440 A1 | 4/2014 | David et al. |
| 2014/0146945 A1 | 5/2014 | Fredenberg et al. |
| 2014/0153692 A1 | 6/2014 | Larkin et al. |
| 2014/0177800 A1 | 6/2014 | Sato et al. |
| 2014/0185778 A1 | 7/2014 | Lee et al. |
| 2014/0205057 A1 | 7/2014 | Koehler et al. |
| 2014/0211919 A1 | 7/2014 | Ogura et al. |
| 2014/0226785 A1 | 8/2014 | Stutman et al. |
| 2014/0270060 A1 | 9/2014 | Date et al. |
| 2014/0369469 A1 | 12/2014 | Ogura et al. |
| 2014/0369471 A1 | 12/2014 | Ogura et al. |
| 2015/0023472 A1 | 1/2015 | Schmitt et al. |
| 2015/0030126 A1 | 1/2015 | Radicke |
| 2015/0030127 A1 | 1/2015 | Aoki et al. |
| 2015/0043713 A1 | 2/2015 | Chen |
| 2015/0049860 A1 | 2/2015 | Das |
| 2015/0051877 A1 | 2/2015 | Bakeman et al. |
| 2015/0055743 A1 | 2/2015 | Vedantham et al. |
| 2015/0055745 A1 | 2/2015 | Holzner et al. |
| 2015/0071402 A1 | 3/2015 | Handa |
| 2015/0092923 A1 | 4/2015 | Lida et al. |
| 2015/0092924 A1 | 4/2015 | Yun et al. |
| 2015/0110252 A1 | 4/2015 | Yun et al. |
| 2015/0117599 A1 | 4/2015 | Yun et al. |
| 2015/0146847 A1 | 5/2015 | Liu |
| 2015/0160354 A1 | 6/2015 | Mertens et al. |
| 2015/0194287 A1 | 7/2015 | Yun et al. |
| 2015/0243397 A1 | 8/2015 | Yun et al. |
| 2015/0247811 A1 | 9/2015 | Yun et al. |
| 2015/0260663 A1 | 9/2015 | Yun et al. |

(56) References Cited

U.S. PATENT DOCUMENTS

| | | |
|---|---|---|
| 2015/0270023 A1 | 9/2015 | Adler |
| 2015/0323474 A1 | 11/2015 | Case et al. |
| 2015/0323478 A1 | 11/2015 | Stutman |
| 2015/0357069 A1 | 12/2015 | Yun et al. |
| 2016/0064175 A1 | 3/2016 | Yun et al. |
| 2016/0064177 A1 | 3/2016 | Gossmann et al. |
| 2016/0066870 A1 | 3/2016 | Yun et al. |
| 2016/0091701 A1 | 3/2016 | Raghunathan |
| 2016/0106387 A1 | 4/2016 | Kahn |
| 2016/0174922 A1 | 6/2016 | Kodera et al. |
| 2016/0178540 A1 | 6/2016 | Yun et al. |
| 2016/0178541 A1 | 6/2016 | Hwang et al. |
| 2016/0206259 A1 | 7/2016 | Auclair et al. |
| 2016/0268094 A1 | 9/2016 | Yun et al. |
| 2016/0320320 A1 | 11/2016 | Yun et al. |
| 2016/0336140 A1 | 11/2016 | Nonoguchi et al. |
| 2016/0341674 A1 | 11/2016 | Wu et al. |
| 2016/0351283 A1 | 12/2016 | Adler et al. |
| 2016/0351370 A1 | 12/2016 | Yun et al. |
| 2017/0018392 A1 | 1/2017 | Cheng |
| 2017/0038481 A1 | 2/2017 | Cheng et al. |
| 2017/0047191 A1 | 2/2017 | Yun et al. |
| 2017/0162288 A1 | 6/2017 | Yun et al. |
| 2017/0162359 A1 | 6/2017 | Tang et al. |
| 2017/0176356 A1 | 6/2017 | Hoffman et al. |
| 2017/0184520 A1 | 6/2017 | Mortensen et al. |
| 2017/0227476 A1 | 8/2017 | Zhang et al. |
| 2017/0234811 A1 | 8/2017 | Zhang et al. |
| 2017/0261442 A1 | 9/2017 | Yun et al. |
| 2017/0336334 A1 | 11/2017 | Yun et al. |
| 2018/0144901 A1 | 5/2018 | Yun et al. |
| 2018/0182131 A1 | 6/2018 | Koehler et al. |
| 2018/0202951 A1 | 7/2018 | Yun et al. |
| 2018/0261352 A1 | 9/2018 | Matsuyama et al. |
| 2018/0306734 A1 | 10/2018 | Morimoto et al. |
| 2018/0323032 A1 | 11/2018 | Strelec et al. |
| 2018/0348151 A1 | 12/2018 | Kasper et al. |
| 2019/0011379 A1 | 1/2019 | Yun et al. |
| 2019/0017942 A1 | 1/2019 | Filevich |
| 2019/0017946 A1 | 1/2019 | Wack et al. |
| 2019/0019647 A1 | 1/2019 | Lee et al. |
| 2019/0027265 A1 | 1/2019 | Dey et al. |
| 2019/0057832 A1 | 2/2019 | Durst et al. |
| 2019/0064084 A1 | 2/2019 | Ullom et al. |
| 2019/0086342 A1 | 3/2019 | Pois et al. |
| 2019/0088439 A1 | 3/2019 | Honda |
| 2019/0115184 A1 | 4/2019 | Zalubovsky |
| 2019/0131103 A1 | 5/2019 | Tuohimaa |
| 2019/0132936 A1 | 5/2019 | Steck et al. |
| 2019/0145917 A1 | 5/2019 | Yun et al. |
| 2019/0148102 A1 | 5/2019 | Maltz |
| 2019/0172681 A1 | 6/2019 | Owen et al. |
| 2019/0189385 A1 | 6/2019 | Liang et al. |
| 2019/0204757 A1 | 7/2019 | Brussard et al. |
| 2019/0206652 A1 | 7/2019 | Akinwande et al. |
| 2019/0212281 A1 | 7/2019 | Shchgegrov |
| 2019/0214216 A1 | 7/2019 | Jeong et al. |
| 2019/0216416 A1 | 7/2019 | Koehler et al. |
| 2019/0219713 A1 | 7/2019 | Booker et al. |
| 2019/0257774 A1 | 8/2019 | Seidler et al. |
| 2019/0261935 A1 | 8/2019 | Kitamura |
| 2019/0302042 A1 | 10/2019 | Yun et al. |
| 2019/0304735 A1 | 10/2019 | Safai et al. |
| 2019/0311874 A1 | 10/2019 | Tuohimma et al. |
| 2019/0317027 A1 | 10/2019 | Tsuboi et al. |
| 2019/0331616 A1 | 10/2019 | Schaff et al. |
| 2019/0341219 A1 | 11/2019 | Zhang et al. |
| 2019/0341220 A1 | 11/2019 | Parker et al. |
| 2019/0369271 A1 | 12/2019 | Yun et al. |
| 2019/0369272 A1 | 12/2019 | Yun et al. |
| 2019/0380193 A1 | 12/2019 | Matsuhana et al. |
| 2019/0387602 A1 | 12/2019 | Woywode et al. |
| 2019/0391087 A1 | 12/2019 | Matejka et al. |
| 2020/0003712 A1 | 1/2020 | Kataoka et al. |
| 2020/0041429 A1 | 2/2020 | Cho et al. |
| 2020/0058462 A1 | 2/2020 | Suzuki |
| 2020/0072770 A1 | 3/2020 | Yun et al. |
| 2020/0088656 A1 | 3/2020 | Pois et al. |
| 2020/0090826 A1 | 3/2020 | Adler |
| 2020/0098537 A1 | 3/2020 | Yun et al. |
| 2020/0103358 A1 | 4/2020 | Wiell et al. |
| 2020/0105492 A1 | 4/2020 | Behling et al. |
| 2020/0154552 A1 | 5/2020 | Suzuki et al. |
| 2020/0155088 A1 | 5/2020 | Gruener et al. |
| 2020/0158662 A1 | 5/2020 | Horiba et al. |
| 2020/0163195 A1 | 5/2020 | Steck et al. |
| 2020/0168427 A1 | 5/2020 | Krokhmal et al. |
| 2020/0182806 A1 | 6/2020 | Kappler et al. |
| 2020/0187339 A1 | 6/2020 | Freudenberger et al. |
| 2020/0194212 A1 | 6/2020 | Dalakos et al. |
| 2020/0203113 A1 | 6/2020 | Ponard |
| 2020/0225172 A1 | 7/2020 | Sato et al. |
| 2020/0225173 A1 | 7/2020 | Sato et al. |
| 2020/0225371 A1 | 7/2020 | Greenberg et al. |
| 2020/0232937 A1 | 7/2020 | Yaroshenko et al. |
| 2020/0234908 A1 | 7/2020 | Fishman et al. |
| 2020/0279351 A1 | 9/2020 | Ratner et al. |
| 2020/0292475 A1 | 9/2020 | Cao et al. |
| 2020/0300789 A1 | 9/2020 | Osakabe et al. |
| 2020/0300790 A1 | 9/2020 | Gellineau et al. |
| 2020/0303265 A1 | 9/2020 | Gellineau et al. |
| 2020/0305809 A1 | 10/2020 | Schwoebel et al. |
| 2020/0319120 A1 | 10/2020 | Kitamura et al. |
| 2020/0321184 A1 | 10/2020 | Parker et al. |
| 2020/0337659 A1 | 10/2020 | Sano et al. |
| 2020/0365361 A1 | 11/2020 | Yun et al. |
| 2020/0378905 A1 | 12/2020 | Safai |
| 2020/0378908 A1 | 12/2020 | Fujimura et al. |
| 2020/0388461 A1 | 12/2020 | Behling et al. |
| 2021/0020398 A1 | 1/2021 | Yun et al. |
| 2021/0055237 A1 | 2/2021 | Shchegrov et al. |
| 2021/0080408 A1 | 3/2021 | Yun et al. |
| 2021/0255123 A1 | 8/2021 | Koskinen et al. |
| 2021/0356412 A1 | 11/2021 | Yun et al. |
| 2022/0003694 A1 | 1/2022 | Seidler et al. |
| 2022/0082515 A1 | 3/2022 | Yun et al. |
| 2022/0178851 A1* | 6/2022 | Yun ............... G01N 23/046 |

FOREIGN PATENT DOCUMENTS

| | | |
|---|---|---|
| CN | 101257851 B | 9/2008 |
| CN | 101532969 B | 9/2009 |
| CN | 101566591 A | 10/2009 |
| CN | 101576515 A | 11/2009 |
| CN | 101413905 A | 3/2011 |
| CN | 102124537 A | 7/2011 |
| CN | 102325498 B | 1/2012 |
| CN | 1917135 A | 3/2012 |
| CN | 102507623 A | 6/2012 |
| CN | 102551761 A | 7/2012 |
| CN | 103604818 A | 2/2014 |
| CN | 104264228 A | 1/2015 |
| CN | 104068875 A | 5/2017 |
| CN | 206531787 U | 9/2017 |
| DE | 102007048743 A1 | 6/2010 |
| DE | 102013013344 A1 | 2/2015 |
| EP | 0432568 | 6/1991 |
| EP | 0751533 | 1/1997 |
| EP | 1028451 | 8/2000 |
| EP | 1169713 | 1/2006 |
| EP | 3093867 A1 | 11/2016 |
| EP | 3168856 A2 | 5/2017 |
| FR | 2548447 | 1/1985 |
| JP | H01-097844 A | 4/1989 |
| JP | H04-285847 A | 10/1992 |
| JP | H06-188092 | 7/1994 |
| JP | H06-213833 A | 8/1994 |
| JP | H07-056000 | 3/1995 |
| JP | H07-194592 | 8/1995 |
| JP | H07-311165 A | 11/1995 |
| JP | H08-128971 | 5/1996 |
| JP | H08-184572 | 7/1996 |
| JP | H09-166488 | 6/1997 |
| JP | H10-318737 A | 12/1998 |

(56) References Cited

FOREIGN PATENT DOCUMENTS

| | | |
|---|---|---|
| JP | H11-006804 A | 1/1999 |
| JP | H11-304728 | 11/1999 |
| JP | H11-352079 | 12/1999 |
| JP | 2000-306533 | 11/2000 |
| JP | 2001-021507 | 1/2001 |
| JP | 2001-124711 | 5/2001 |
| JP | 2001-235437 | 8/2001 |
| JP | 2002-214165 | 7/2002 |
| JP | 2003-149392 | 5/2003 |
| JP | 2003-288853 | 10/2003 |
| JP | 2003-329616 | 11/2003 |
| JP | 2004-089445 | 3/2004 |
| JP | 2004-518262 | 6/2004 |
| JP | 2004-333131 | 11/2004 |
| JP | 2006-501444 | 1/2006 |
| JP | 2006-164819 | 6/2006 |
| JP | 2007-212272 A | 8/2007 |
| JP | 2007-218683 | 8/2007 |
| JP | 2007-265981 | 10/2007 |
| JP | 2007-311185 | 11/2007 |
| JP | 2008-200359 | 4/2008 |
| JP | 2008-145111 | 6/2008 |
| JP | 2008-197495 | 8/2008 |
| JP | 2009-195349 | 3/2009 |
| JP | 2009-212058 | 9/2009 |
| JP | 2010-032341 A | 2/2010 |
| JP | 2010-236986 | 10/2010 |
| JP | 2011-029072 | 2/2011 |
| JP | 2011-033537 | 2/2011 |
| JP | 2011-095224 | 5/2011 |
| JP | 2011-218147 | 11/2011 |
| JP | 2012-032387 | 2/2012 |
| JP | 2012-187341 | 10/2012 |
| JP | H06-102399 A | 10/2012 |
| JP | 2012-254294 | 12/2012 |
| JP | 2013-508683 | 3/2013 |
| JP | 2013-096750 | 5/2013 |
| JP | 2013-113782 | 6/2013 |
| JP | 2013-529984 | 7/2013 |
| JP | 2013-157269 | 8/2013 |
| JP | 2013-160637 | 8/2013 |
| JP | 2013-181811 | 9/2013 |
| JP | 2013-239317 | 11/2013 |
| JP | 2014-178130 | 9/2014 |
| JP | 2015-002074 | 1/2015 |
| JP | 2015-047306 | 3/2015 |
| JP | 2015-072263 | 4/2015 |
| JP | 2015-077289 | 4/2015 |
| JP | 2016-537797 | 12/2016 |
| JP | 2017-040618 | 2/2017 |
| KR | 10-2004-0072780 | 8/2004 |
| KR | 10-2006-0088272 A | 8/2006 |
| KR | 10-2012-0012391 | 2/2012 |
| KR | 10-2012-0091591 A | 8/2012 |
| KR | 10-2014-0059688 | 5/2014 |
| WO | WO 1995/006952 | 3/1995 |
| WO | WO 1998/011592 | 3/1998 |
| WO | WO 1998/041992 | 9/1998 |
| WO | WO 2002/039792 | 5/2002 |
| WO | WO 2003/081631 | 10/2003 |
| WO | WO 2005/109969 | 11/2005 |
| WO | WO 2006/096052 | 9/2006 |
| WO | WO 2007/125833 | 11/2007 |
| WO | WO 2007/135811 | 11/2007 |
| WO | WO 2008/068044 | 6/2008 |
| WO | WO 2009/098027 | 8/2009 |
| WO | WO 2009/104560 | 8/2009 |
| WO | WO 2009/121932 | 10/2009 |
| WO | WO 2010/109909 | 9/2010 |
| WO | WO 2011/032572 | 3/2011 |
| WO | WO 2012/032950 | 3/2012 |
| WO | WO 2013/004574 | 1/2013 |
| WO | WO 2013/111050 | 8/2013 |
| WO | WO 2013/118593 | 8/2013 |
| WO | WO 2013/160153 | 10/2013 |
| WO | WO 2013/168468 | 11/2013 |
| WO | WO 2014/054497 | 4/2014 |
| WO | WO 2015/016019 | 2/2015 |
| WO | WO 2015/034791 | 3/2015 |
| WO | WO 2015/066333 | 5/2015 |
| WO | WO 2015/084466 | 6/2015 |
| WO | WO 2015/152490 | 10/2015 |
| WO | WO 2015/168473 | 11/2015 |
| WO | WO 2015/176023 | 11/2015 |
| WO | WO 2015/187219 | 12/2015 |
| WO | WO 2016/187623 | 11/2016 |
| WO | WO 2017/031740 | 3/2017 |
| WO | WO 2017/204850 | 11/2017 |
| WO | WO 2017/213996 | 12/2017 |
| WO | WO 2018/122213 | 7/2018 |
| WO | WO 2018/175570 | 9/2018 |

OTHER PUBLICATIONS

Altapova et al., "Phase contrast laminography based on Talbot interferometry," Opt. Express, vol. 20, No. 6, (2012) pp. 6496-6508.
Andreyev et al., "Boosting the versatility of X-ray microscopes by using robotic arm sample holders," 13th Conf. on Ind. Comp. Tomography, doi.org/10.58286/29261 (2024).
Anklamm et al., "A novel von Hamos spectrometer for efficient X-ray emission spectroscopy in the laboratory," Rev. Sci. Instr. vol. 85 p. 053110 (2014).
Arsana et al., "Laboratory Liquid-Jet X-ray Microscopy and X-ray Fluorescence Imaging for Biomedical Applications," Int'l J. Mol. Sci., Vo. 25, p. 920 (2024).
Bachucki et al., "Laboratory-based double X-ray spectrometer for simultaneous X-ray emission and X-ray absorption studies," J. Anal. Atomic Spectr. DOI:10.1039/C9JA00159J (2019).
Baron et al., "A compact optical design for Bragg reflections near backscattering," J. Synchrotron Rad., vol. 8 (2001), pp. 1127-1130.
Bauer et al., "Increasing the sensitivity of micro X-ray fluorescence spectroscopy through an optimized adaptation of polycapillary lenses to a liquid metal jet source," J. Anal. At. Spectrom. DOI:10.1039/d1ja00295c (2021).
Bech, "In-vivo dark-field and phase-contrast x-ray imaging," Scientific Reports 3, (2013), Article No. 03209.
Bech, "X-ray imaging with a grating interferometer," University of Copenhagen PhD. Thesis, (May 1, 2009).
Behling, "Medical X-ray sources Now and for the Future," Nucl. Inst. and Methods in Physics Research A 873, pp. 43-50 (2017).
Bertaux et al., "Sub-pixel high-resolution imaging of high-energy x-rays inspired by sub-wavelength optical imaging," Op. Express, vol. 29, No. 22-25, p. 35003 (2021).
Bertilson et al., "Analyzer-free Hard X-ray Interferometry," Phys. Med. Biol. https://doi.org/10.1088/1361-6560/ad1f84 (2024).
Birkholz, "Chapter 4: Grazing Incidence Configurations," Thin Film Analysis by X-ray Scattering (Wiley-VCH Verlag Gmbh & Co. KGaA, Weinheim, Germany, 2006).
Birnbacher et al., "Quantitative X-ray phase contrast computed tomography with grating interferometry," European J. of Nucl. Med. and Mol. Imaging, https://doi.org/10.1007/s00259-021-05259-6 (2021).
Bjeoumikhov et al., "A modular system for XRF and XRD applications consisting of a microfocus X-ray source and different capillary optics," X-ray Spectrometry, vol. 33 (2004), pp. 312-316.
Bogdanowicz et al., "Model-free measurement of lateral recess in gate-all-around transistors with micro hard-X-ray fluorescence," J. Micro/Nanopattern, Mater. Metrol., vol. 22(3), pp. 034001-1-8 (2023).
Boin et al., "Operating Liquid Metaljet X-Ray Sources for Materials Research," 67th ICFA Adv. Bean Dyn. Workshop Future Light Sources, doi:10.18429/JACoW-FLS2023-WE1L4 (2023).
Brombal et al., "PEPI Lab: a flexible compact multi-modal setup for X-ray phase-contrast and spectral imaging," Sci. Rep. 13, p. 4206, https://doi.org/10.1038/s41598-023-30316-5 (2023).
Bryant, A new x-ray source technology for demanding SMT and Semiconductor inspection (IMPACT 23, S20-3), doi: 10.1109/IMPACT59481.2023.10348903 (2023).

(56) References Cited

OTHER PUBLICATIONS

Buchanan et al., "Effective modelling of high-energy laboratory-based x-ray phase contrast imaging utilising absorption masks or gratings," J. Appl. Physics (accepted) (2020).

Chen et al., "Advance in detection of low sulfur content by wavelength dispersive XRF," Proceedings of the Annual ISA Analysis Division Symposium (2002).

Chervenak et al., "Experimental thick-target bremsstrahlung spectra from electrons in the range 10 to 30 keV", Phys. Rev. A vol. 12 (1975), pp. 26-33.

Coan et al., "In vivo x-ray phase contrast analyzer-based imaging for longitudinal osteoarthritis studies in guinea pigs," Phys. Med. Biol. vol. 55(24) (2010), pp. 7649-7662.

Cohen et al., "Tunable laboratory extended x-ray absorption fine structure system," Rev. Sci. Instr. vol. 51, No. 3, Mar. 1980, pp. 273-277.

David et al., "Hard X-ray phase imaging and tomography using a grating interferometer," Spectrochimica Acta Part B vol. 62 (2007) pp. 626-630.

Davis et al., "Bridging the Micro-to-Macro Gap: A New Application for Micro X-Ray Fluorescence," Microsc. Microanal., vol. 17(3) (Jun. 2011), pp. 410-417.

De Pauw et al., "A review of laboratory, commercially available, and facility based wavelength dispersive X-ray fluorescence spectrometers," J. Anal. At. Spectrom., doi: 10.1039/d3ja00315a (2023).

Detlefs et al., "Fast Chemical Contrast by X-ray Fluorescence Intensity Ratio Detection," Anal. Chem., https://doi.org/10.1021/acs.analchem.3c00623 (2023).

Dewulf et al., "Advances in the metrological traceability and performance of X-ray computed tomography," CIRP Annals—Manuf. Tech. vol. 00, 1-24 (2022).

Diaz et al., "Monte Carlo Simulation of Scatter Field for Calculation of Contrast of Discs in Synthetic CDMAM Images," In: Digital Mammography, Proceedings 10th International Workshop IWDM 2010 (Springer Verlag, Berlin Heidelberg), (2010), pp. 628-635 (9 pages).

Dibernardo, "Non-disruptive techniques for depth profiling in photoemission spectroscopy," Nature Review Physics, https://doi.org/10.1038/s42254-021-00331-4 (2021).

Dittler et al., "A mail-in and user facility for X-ray absorption near-edge structure: the CEI-XANES laboratory X-ray spectrometer at University of Washington," J. Synch. Rad. vol. 26, eight pages, (2019).

Dong et al., "Improving Molecular Sensitivity in X-Ray Fluorescence Molecular Imaging (XFMI) of Iodine Distribution in Mouse-Sized Phantoms via Excitation Spectrum Optimization," IEEE Access, vol. 6, pp. 56966-56976 (2018).

Du et al., "Removal of artifacts caused by grating imperfections in X-ray phase contrast tomography," J. of Inst. vol. 16, P06039, doi.org/10.1088/1748-0221/16/06/P06039 (2021).

Erko et al., "X-ray Optics," Ch. 3 of "Handbook of Practical X-Ray Fluorescence Analysis," B. Beckhoff et al., eds. (Springer, Berlin, Germany, 2006), pp. 85-198.

Espes et al., "High-resolution X-ray source with advanced e-beam technology: pushing the resolution limitation for lab-scale NanoCT," Micros. Microanal., vol. 27 (Suppl. 1), pp. 1230 (2021).

Feng et al., "Reduction of Compton Background Noise for X-ray Fluorescence Computed Tomography with Deep Learning," Photonics, vol. 9, p. 108 (2022).

Fernández-Ruiz, "TXRF Spectrometry as a Powerful Tool for the Study of Metallic Traces in Biological Systems," Development in Analytical Chemistry, vol. 1 (2014), pp. 1-14.

Fisher et al., "Laminography in the lab: imaging planar objects using a conventional x-ray CT scanner," Meas. Sci. Technol., vol. 30, p. 035401 (2019).

Flenner et al., "Hard X-ray full-field nanoimaging using a direct photon-counting detector," J. Synch. Rad., https://doi.org/10.1107/S1600577522012103 (2022).

Fraunhofer, "High-resolution computed laminography (HRCL) for electronic components," https://www.ikts.fraunhofer.de/en/departments/electronics_microsystems_biomedicine/condition_monitoring_non-destructive_testing/ndt_test_lab/3D-X-ray_inspection_industrial_components/computed_laminography_printed_circuit_board_inspection.html, (2024).

Gaur et al., "On the method of calibration of the energy dispersive EXAFS beamline and Indus-2 and fitting theoretical model to the EXAFS spectrum," Sadhana, vol. 36, No. 3 pp. 3390348 (2011).

Ge et al., "Investigation of the partially coherent effects in a 2D Talbot interferometer," Anal. Bioanal. Chem. vol. 401, (2011), pp. 865-870.

Ge et al., "Self-absorption correction on 2D X-ray fluorescence maps," Sci. Rep. 13, p. 7271, https://doi.org/10.1038/s41598-023-33383-w (2023).

Ghani et al., "A Phase Sensitive X-ray Brest Tomosynthesis System: Preliminary Patient Images with Cancer Legions," Phys. Med. Biol. https://doi.org/10.1088/1361-6560/ac2ea6 (2021).

Gironda et al., "Asymmetric Rowland circle geometries for spherically bent crystal analyzers in laboratory and synchrotron applications," J. Anal. At. Spectrom., doi: 10.1039/d3ja00437f (2024).

Gonzales et al., "Angular Distribution of Bremsstrahlung Produced by 10-Kev And 20 Kev Electrons Incident on a Thick Au Target", in Application of Accelerators in Research and Industry, AIP Conf. Proc. 1221 (2013), pp. 114-117.

Gonzales et al., "Angular distribution of thick-target bremsstrahlung produced by electrons with initial energies ranging from 10 to 20 keV incident on Ag", Phys. Rev. A vol. 84 (2011): 052726.

Graetz et al., "Lenseless X-ray Nano-Tomography down to 150 nm Resolution: On the Quantification of Modulation Transfer and Focal Spot of the Lab-based ntCT System," arXiv:2009.11749v1 [physics.ins-det] Sep. 24, 2020, 16 pages.

Gu et al., "A Breakthrough in Resolution and Scan Speed: Overcome the Challenges of 3D X-ray Imaging Workflows for Electronics Package Failure Analysis," 2023 IEEE Int'l Symp. Phys. and Failure Analysis of Integrated Circuits (IPFA), doi: 10.1109/IPFA58228.2023.10249028 (2023).

Günther et al., "Full-field structured-illumination super-resolution X-ray transmission microscopy," Nature Comm. 10:2494 (2019) and supplementary information.

Gustschin et al., "High resolution and sensitivity bi-directional x-ray phase contrast imaging using 2D Talbot array illuminators," arXiv:2105.07347v1 [physics.med-ph] May 16, 2021.

Harasse et al., "Iterative reconstruction in x-ray computed laminography from differential phase measurements", Opt. Express. vol. 19 (2011), pp. 16560-16573.

Harasse et al., "X-ray Phase Laminography with a Grating Interferometer using Iterative Reconstruction", in International Workshop on X-ray and Neutron Phase Imaging with Gratings, AIP Conf. Proc. vol. 1466, (2012), pp. 163-168.

Harasse et al., "X-ray Phase Laminography with Talbot Interferometer", in Developments in X-Ray Tomography VII, Proc. SPIE vol. 7804 (2010), 780411.

Hashimoto et al., "Improved reconstruction method for phase stepping data with stepping errors and dose fluctuations," Optics Express, vol. 28, No. 11, pp. 16363-16384 (2020).

Hasse et al., "New developments in laboratory-based x-ray sources and optics," Adv. In Laboratory-based X-Ray Sources, Optics, and Applications VI, ed. A.M. Khounsary, Proc. SPIE vol. 10387, 103870B-1 (2017).

Haug et al., A laboratory-based multifunctional near ambient pressure X-ray photoelectron spectroscopy system for electrochemical, catalytic, and cryogenic studies, Rev. Sci. Instr. vol. 94, 065104, https://doi.org/10.1063/5.0151755 (2023).

Heirwegh et al., "The focused beam X-ray fluorescence elemental quantification software package PIQUANT," Spectrochimica Acta Part B: Atomic Spectroscopy, https://doi.org/10/1016/j.sab.2022.106520 (2022).

Hemraj-Benny et al., "Near-Edge X-ray Absorption Fine Structure Spectroscopy as a Tool for Investigating Nanomaterials," Small, vol. 2(1), (2006), pp. 26-35.

Hennekam et al., "Trace metal analysis of sediment cores using a novel X-ray fluorescence core scanning method," Quaternary Int'l, https://doi.org/10.1016/j.quaint.2018.10.018 (2018).

(56) References Cited

OTHER PUBLICATIONS

Hirano et al., "X-ray zooming optics for analyzer-based multi-contrast computed tomography," J. Synch. Rad. vol. 29, https://doi.org/10.1107/S1600577522001412 (2022).
Holberg et al., "High-Resolution Table-Top NEXAFS Spectroscopy," Anal. Chem. https://10.1021/acs.analchem.1c04374 (2022).
Holfelder et al., "A double crystal von Hamos spectrometer for traceable x-ray emission spectroscopy," Rev. Sci. Instrum. vol 92, p. 123105 (2021).
Hönlcke et al., "Reference-free X-ray fluorescence analysis with a micrometer-sized incident beam," Nanotechnology, https://doi.org/10.1088/1361-6528/ad3aff (2024).
Honma et al., Full-automatic XAFS Measurement System of the Engineering Science Research II beamline BL14B2 at Spring-8, 2011, AIP Conference Proceedings 1234, pp. 13-16.
Hoshino et al., "High-energy X-ray micro-laminography to visualize microstructures in dense planar object," J. Synch. Rad. https://doi.org/10.1107/S1600577522012176 (2022).
Howard et al., "High-Definition X-ray Fluorescence Elemental Mapping of Paintings," Anal. Chem., 2012, vol. 84(7), pp. 3278-3286.
Hu et al., "Improving small animal cone beam CT resolution by mitigating x-ray focal spot induced blurring via deconvolution," Phys. Med. Bio., in press, https://doi.org/10.1088/1361-6560/ac6b7a (2022).
Ide-Ektessabi et al., "The role of trace metallic elements in neurodegenerative disorders: quantitative analysis using XRF and XANES spectroscopy," Anal. Sci., vol. 21(7) (Jul. 2005), pp. 885-892.
Ihsan et al., "A microfocus X-ray tube based on a microstructured X-ray target", Nuclear Instruments and Methods in Physics Research B vol. 267 (2009) pp. 3566-3573.
Ishisaka et al., "A New Method of Analyzing Edge Effect in Phase Contrast Imaging with Incoherent X-rays," Optical Review, vol. 7, No. 6, (2000), pp. 566-572.
Ito et al., "A Stable In-Laboratory EXAFS Measurement System," Jap. J. Appl. Phys., vol. 22, No. 2, Feb. 1, 1983, pp. 357-360.
Itoh et al., "Two-dimensional grating-based X-ray phase-contrast imaging using Fourier transform phase retrieval," Op. Express, vol. 19, No. 4 (2011) pp. 3339-3346.
Jahrman et al., "Vacuum formed temporary spherically and toroidally bent crystal analyzers for x-ray absorption and x-ray emission spectroscopy," Rev. Sci. Inst. vol. 90, 013106 (2019).
Janssens et al., "Recent trends in quantitative aspects of microscopic X-ray fluorescence analysis," TrAC Trends in Analytical Chemistry 29.6 (Jun. 2010): 464-478.
Jiang et al., "X-Ray Phase-Contrast Imaging with Three 2D Gratings," Int. J. Biomed. Imaging, (2008), 827152, 8 pages.
Jin et al., "Development of an X-ray tube with two selective targets modulated by a magnetic field," Rev. Sci. Inst. vol. 90, 083105 (2019).
Kalasová et al., "Characterization of a laboratory-based X-ray computed nanotomography system for propagation-based method of phase contrast imaging," IEEE Trans. On Instr. And Meas., DOI 10.1109/TIM.2019.2910338 (2019).
Keyrilainen et al., "Phase contrast X-ray imaging of breast," Acta Radiologica, vol. 51 (8), (2010), pp. 866-884.
Khan et al., "Recent Trends in Applications of X-ray Photoelectron Spectroscopy (XPS) Technique in Coatings for Corrosion Protection," Chapter of "Recent Developments in Analytical Techniques for Corrosion Research," I. Toor (ed.), Springer Nature Switzerland AG https://doi.org/10.1007/978-3-030-89101-5_8 (2022).
Kido et al., "Bone Cartilage Imaging with X-ray Interferometry using a Practical X-ray Tube", in Medical Imaging 2010: Physics of Medical Imaging, Proc. SPIE vol. 7622 (2010), 762240.
Kim et al., "Observation of the Talbot Effect at Beamline 6C Bio Medical Imaging of the Pohang Light Source-II," J. Korean Phys. Soc., vol. 74, No. 10, pp. 935-940 (May 2019).
Kim et al., "A Simulation Study on the Transfer Characteristics of the Talbot Pattern Through Scintillation Screens in the Grating Interferometer," J. Rad. Sci. and Tech. 42(1), pp. 67-75 (2019).
Kim, "Talbot images of wavelength-scale amplitude gratings," Opt. Express vol. 20(5), (2012), pp. 4904-4920.
Kiranjot et al., "Surface and interface characterization of Ru/C/Ru trilayer structure using grazing incidence X-ray reflectivity and X-ray fluorescence," Surf. And Interface Analysis, doi: 10.1002/sia7016 (2021).
Kiyohara et al., "Development of the Talbot-Lau Interferometry System Available for Clinical Use", in International Workshop on X-ray and Neutron Phase Imaging with Gratings, AIP Cong. Proc. vol. 1466, (2012), pp. 97-102.
Klockenkämper et al., "7.1 Instrumental Developments" and "7.3 Future Prospects by|Combinations," from Chapter 7 of Total Reflection X-ray Fluorescence Analysis and Related Methods 2nd Ed. (J. Wiley and Sons, Hoboken, NJ, 2015).
Klockenkämper et al., "Chapter 3: Instrumentation for TXRF and GI-XRF," Total Reflection X-ray Fluorescence Analysis and Related Methods 2nd Ed. (J. Wiley and Sons, Hoboken, NJ, 2015).
Kottler et al., "A two-directional approach for grating based differential phase contrast imaging using hard x-rays," Opt. Express vol. 15(3), (2007), pp. 1175-1181.
Kottler et al., "Dual energy phase contrast x-ray imaging with Talbot-Lau interferometer," J. Appl. Phys. vol. 108(11), (2010), 114906.
Kulow et al., "On the Way to Full-Field X-ray Fluorescence Spectroscopy Imaging with Coded Apertures," J. Anal. At. Spectrom. Doi: 10.1039/C9JA00232D (2019).
Kutukova et al., "Laboratory High-Contrast X-ray Microscopy of Copper Nanostructures Enabled by a Liquid-Metal-Jet X-ray Source," Nanomaterials, vol. 14, p. 448 (2024).
Kuwabara et al., "Hard-X-ray Phase-Difference Microscopy with a Low-Brilliance Laboratory X-ray Source", Appl. Phys. Express vol. 4 (2011) 062502.
Langhoff et al., "X-ray Sources," Ch. 2 of "Handbook of Practical X-Ray Fluorescence Analysis," B. Beckhoff et al., eds. (Springer, Berlin Heidelberg New York, 2006), pp. 33-82.
Leatham et al., "X-ray dark-field and phase retrieval without optics, via the Fokker-Planck equation," arXiv:2122.10999v1, physics.med-ph, Dec. 21, 2021.
Lei et al., "8-inch-diameter field of view for X-ray differential phase-contrast imaging," Nucl. Inst. And Methods in Physics Research A, https://doi.org/10-1016/j.nima.2021.165375 (2021).
Li et al., "Study on High Thermal Conductivity of X-ray Anode with Composite Diamond Substrate," J. Phys.: Conf. Ser., vol. 1300, 012115 (2019).
Li et al., "X-ray phase-contrast imaging using cascade Talbot-Lau interferometers," Proc. SPIE 10964 (2018), pp. 1096469-1-1096469-6.
Li et al., "Production and Heat Properties of an X-ray Reflective Anode Based on a Diamond Heat Buffer Layer," Materials vol. 13, p. 241 (2020).
Liao et al., "Design of a full-filled transmission X-ray microscope with 30nm resolution," SPIE Proc. Publ., ChinaXiv:202311.00232v1 (2023).
Lin et al., "High energy x-ray Talbot-Lau interferometer employing a microarray anode-structured target source to extend the field of view," Phys. Med. Biol., doi.org/10.1088/1361-6560/ad0196 (2023).
Lin et al., "Quasi-Monte Carlo method for calculating X-ray scatter in CT," Op. Express, vol. 29, No. 9, p. 13746 (2021).
Lohmann et al., "An interferometer based on the Talbot effect," Optics Communications vol. 2 (1971), pp. 413-415.
Longo et al., "Flexible Plenoptic X-ray Microscopy," Photonics, vol. 9, p. 98 (2022).
Luani, "Optimization of e-beam and x-ray target geometry of a solid x-ray anode source," Uppsala Universitet, Dept. of Physics, Thesis for Masters degree in physics (2021).
Lübcke et al., "Soft X-ray nanoscale imaging using a sub-pixel resolution charge coupled device (CCD) camera," Rev. Sci. Instrum. vol. 90, 043111 (2019).

(56) References Cited

OTHER PUBLICATIONS

Lucht et al., "Phase retrieval beyond the homogeneous object assumption for X-ray in-line holographic imaging," arXiv:2403.00461v1 [eess.IV] (2024).
Lühl et al., "Scanning transmission X-ray microscopy with efficient X-ray fluorescence detection (STXM-XRF) for biomedical applications in the soft and tender energy range," J. Synch. Rad. vol. 26, https://doi.org/10.1107/S1600577518016879, (2019).
Maisl et al., "Computed Laminography for X-ray Inspection of Lightweight Constructions," 2nd Int'l Symp. on NDT in Aerospace 2010—Mo.3.A.3, https://www.ndt.net/?id+10375 (2010).
Malzer et al., "A laboratory spectrometer for high throughput X-ray emission spectroscopy in catalysis research," Rev. Sci. Inst. 89, 113111 (2018).
Mamyrbayev et al., "Staircase array of inclined refractive multilenses for large field of view pixel super-resolution scanning transmission hard X-ray microscopy," J. Synch. Rad., vol. 28 https://doi.org/10.1107/S1600577521001521 (2021).
Matsunaga et al., "Development of projection X-ray microscope with 10 nm spot size," Nodestr. Test. And Eval., https://doi.org.10.1080/10589759.2022.2083616 (2022).
Matsuyama et al., "Wavefront measurement for a hard-X-ray nanobeam using single-grating interferometry", Opt. Express vol. 20 (2012), pp. 24977-24986.
Menzies et al., "Dual source X-ray and electron SEM system: Elemental mapping of an Epithermal gold-bearing sample from Karangahake, New Zealand," Microsc. Microanal., vol. 27 (Suppl. 1), p. 456 (2021).
Miao et al., "A four-grating interferometer for x-ray multi-contrast imaging," Med. Physics, doi: 10.1002/mp.17052 (2024).
Miao et al., "Motionless phase stepping in X-ray phase contrast imaging with a compact source," Proceedings of the National Academy of Sciences, vol. 110(48), (2013), pp. 19268-19272.
Mijovilovich et al., "Analysis of trace metal distribution in plants with lab-based microscopic X-ray fluorescence imaging," Plant Methods, vol. 16, No. 82, 21 pages (2020).
Mizutani et al., X-ray microscopy for neural circuit reconstruction in 9th International Conference on X-Ray Microscopy, J. Phys: Conf. Ser. 186 (2009) 012092.
Modregger et al., "Grating-Based X-ray Phase Contrast Imaging," Ch. 3 of Emerging Imaging Technologies in Medicine, M. Anastasio & P. La Riviere, ed., CRC Press, Boca Raton, FL, (2012), pp. 43-56.
Momose et al., "Biomedical Imaging by Talbot-Type X-Ray Phase Tomography" in Developments in X-Ray Tomography V, Proc. SPIE vol. 6318 (2006) 63180T.
Momose et al., "Development of grating-based super-resolution x-ray phase imaging," AIP Conf. Proc. 2990, 030003 (2023).
Momose et al., "Grating-Based X-ray Phase Imaging Using Multiline X-ray Source", Jpn. J. Appl. Phys. vol. 48 (2009), 076512.
Momose et al., "Phase Tomography by X-ray Talbot Interferometry for Biological Imaging" Jpn. J. Appl. Phys. vol. 45 2006 pp. 5254-5262.
Momose et al., "Phase Tomography Using X-ray Talbot Interferometer", in Synchrotron Radiation Instrumentation: Ninth International Conference, AIP Conf. Proc. vol. 879 (2007), pp. 1365-1368.
Momose et al., "Phase-Contrast X-Ray Imaging Using an X-Ray Interferometer for Biological Imaging", Analytical Sciences vol. 17 Supplement (2001), pp. i527-i530.
Momose et al., "Recent Progress in X-ray and Neutron Phase Imaging with Gratings," Quantum Beam Science, vol. 4, No. 9; doi:10.3390/qubs4010009 (2020).
Momose et al., "Sensitivity of X-ray Phase Imaging Based on Talbot Interferometry", Jpn. J. Appl. Phys. vol. 47 (2008), pp. 8077-8080.
Momose et al., "X-ray Phase Measurements with Talbot Interferometry and its Applications", in International Conference on Advanced Phase Measurement Methods in Optics and Imaging, AIP Conf. Proc. vol. 1236 (2010), pp. 195-199.
Momose et al., "X-ray Phase Imaging —From Static Observation to Dynamic Observation—", in International Workshop on X-ray and Neutron Phase Imaging with Gratings AIP Conf. Proc. vol. 1466, (2012), pp. 67-77.
Momose et al., "X-ray Phase Imaging Using Lau Effect", Appl. Phys. Express vol. 4 (2011) 066603.
Momose et al., "X-Ray Phase Imaging with Talbot Interferometry", in "Biomedical Mathematics: Promising Directions in Imaging, Therapy Planning, and Inverse Problems", Y. Censor, M. Jiang & G. Wang, eds. (Medical Physics Publishing, Madison, WI, USA, 2010), pp. 281-320.
Momose et al., "X-ray phase tomography with a Talbot interferometer in combination with an X-ray imaging microscope", in 9th International Conference on X-Ray Microscopy, J. Phys: Conf. Ser. 186 (2009) 012044.
Momose et al., "X-ray Talbot Interferometry with Capillary Plates", Jpn. J. Appl. Phys. vol. 45 (2006), pp. 314-316.
Momose et al., "Four-dimensional X-ray phase tomography with Talbot interferometry and white synchrotron radiation: dynamic observation of a living worm", Opt. Express vol. 19 (2011), pp. 8423-8432.
Momose et al., "High-speed X-ray phase imaging and X-ray phase tomography with Talbot interferometer and white synchrotron radiation", Opt. Express vol. 17 (2009), pp. 12540-12545.
Momose et al., "Phase Imaging with an X-ray Talbot Interferometer", Advances in X-ray Analysis vol. 49(3) (2006), pp. 21-30.
Momose et al., "Demonstration of X-Ray Talbot Interferometry", Jpn. J. Appl. Phys. vol. 42 (2003), pp. L866-L868.
Momose et al., "Phase Tomography Using an X-ray Talbot Interferometer", in Developments in X-Ray Tomography IV, Proc. SPIE vol. 5535 (2004), pp. 352-360.
Momose, "Recent Advances in X-ray Phase Imaging", Jpn. J. Appl. Phys. vol. 44 (2005), pp. 6355-6367.
Morimoto et al., "Design and demonstration of phase gratings for 2D single grating interferometer," Optics Express vol. 23, No. 23, 29399 (2015).
Morimoto et al., "Development of multiline embedded X-ray targets for X-ray phase contrast imaging," XTOP 2012 Book of Abstracts, (Ioffe Physical-Technical Institute of the Russian Academy of Sciences, St. Petersburg, Russia, 2012), pp. 74-75.
Morimoto et al., "X-ray phase contrast imaging by compact Talbot-Lau interferometer with a signal transmission grating," 2014, Optics Letters, vol. 39, No. 15, pp. 4297-4300.
Munro et al., Design of a novel phase contrast imaging system for mammography, 2010, Physics in Medicine and Biology, vol. 55, No. 14, pp. 4169-4185.
Nakamura et al., "Nanoscale X-ray Tomography of Integrated Circuits using a Hybrid Electron/X-ray Microscope: Results and Prospects," 2023 IEEE Phys. Assurance and Inspection of Electron., doi: 10.1109/PAINE58317.2023.10318004 (2023).
Nango et al., "Talbot-defocus multiscan tomography using the synchrotron X-ray microscope to study the lacuno-canalicular network in mouse bone", Biomed. Opt. Express vol. 4 (2013), pp. 917-923.
Nemeth et al., "Laboratory von Hamos X-ray Spectroscopy for Routine Sample Characterization," arvix:1607.08045v1 (2016).
Neuhausler et al., "Non-destructive high-resolution X-ray imaging of ULSI micro-electronics using keV X-ray microscopy in Zernike phase contrast," Microelectronic Engineering, Elsevier Publishers BV., Amsterdam, NO, vol. 83, No. 4-9 (Apr. 1, 2006) pp. 1043-1046.
Newville, "Fundamentals of XAFS," (Univ. of Chicago, Chicago, IL, Jul. 23, 2004).
Nojeh, "Carbon Nanotube Electron Sources: From Electron Beams to Energy Conversion and Optophononics", ISRN Nanomaterials vol. 2014 (2014): 879827.
Novichkov et al., "Laboratory-based X-ray spectrometer for actinide science," J. Synch. Rad. vol. 30, doi.org/10.1107/S1600577523006926 (2023).
Nykanen et al., "X-ray scattering in full-field digital mammography," Med. Phys. vol. 30(7), (2003), pp. 1864-1873.

(56) References Cited

OTHER PUBLICATIONS

O'Brien et al., "Recent Advances in X-ray Cone-beam Computed Laminography," J. X-ray Sci. and Tech., vol. 24, No. 5, pp. 691-707 (2016).

Ohba et al., "Laboratory-size x-ray microscope using Wolter mirror optics and an electron-impact x-ray source," Rev. Sci. Inst. 92, 093704 (2021).

Oji et al., Automatic XAFS measurement system developed at BL14B2 in SPring-8, Available online Nov. 15, 2011, Journal of Synchrotron Radiation, vol. 19, pp. 54-59.

Okolo, "A guide into the world of high-resolution 3D imaging: the case of soft X-ray tomography for the life sciences," Biochem. Soc. Trans., https://doi.org/10.1042/BST20210886 (2002).

Olbinado et al., "Demonstration of Stroboscopic X-ray Talbot Interferometry Using Polychromatic Synchrotron and Laboratory X-ray Sources", Appl. Phys. Express vol. 6 (2013), 096601.

Ortega et al., "Bio-metals imaging and speciation in cells using proton and synchrotron radiation X- ray microspectroscopy," J. Royal Society Interface vol. 6 suppl. 5 (Oct. 6, 2009), pp. 6S649-58.

Otendal et al., A 9 keV electron-impact liquid-gallium-jet x-ray source', Rev. Sci. Instrum. vol. 79 (2008): 016102.

Oxford Instruments Inc., Series 5000 Model XTF5011 X-ray Tube information, Jun. 1998, 3 pages.

Pandeshwar et al., "Envelope modulated x-ray grating interferometry," Appl. Phys. Lett. 120, 193701 (2022).

Pandeshwar et al., "Modeling of beam hardening effects in a dual-phase X-ray grading interferometer for quantitative dark-field imaging," Optics Express, vol. 28, No. 13, Jun. 22, 2020, pp. 19187-19204 (2020).

Parrill et al., "GISAXS—Glancing Incidence Small Angle X-ray Scattering," Journal de Physique IV, vol. 3 (Dec. 1993), pp. 411-417.

Paunesku et al., "X-Ray Fluorescence Microprobe Imaging in Biology and Medicine," J. Cell. Biochem. vol. 99, pp. 1489-1502 (2006).

Pekel et al., "Geometric calibration of seven degree of freedom robotic sample holder for x-ray CT," Proc. of SPIE 12304, 7th Int'l Conf. on Image Formation in X-Ray Computed Tomography, 123042L, doi:10.1117/12.2646492 (2022).

Pfeiffer et al., "Hard-X-ray dark-field imaging using a grating interferometer," Nature Materials vol. 7, (2008), pp. 134-137.

Pfeiffer et al., "Hard x-ray phase tomography with low brilliance x-ray sources," Phys. Rev. Lett. vol. 98, (2007), 108105.

Pfeiffer et al., "Phase retrieval and differential phase-contrast imaging with low-brilliance X-ray sources," Nature Physics vol. 2, (2006), pp. 258-261.

Pfeiffer, "Milestones and basic principles of grating-based x-ray and neutron phase-contrast imaging," in International Workshop on X-ray and Neutron Phase Imaging with Gratings AIP Conf. Proc. vol. 1466, (2012), pp. 2-11.

Pianetta et al., "Application of synchrotron radiation to TXRF analysis of metal contamination on silicon wafer surfaces," Thin Solid Films, vol. 373(1-2), 2000, pp. 222-226.

Poludniowski et al., "Technical Note: SpekPy v2.0—a software toolkit for modelling x-ray tube spectra," doi: 10.1002/MP.14945 (2021).

Potts, "Electron Probe Microanalysis", Ch. 10 of "A Handbook of Silicate Rock Analysis" (Springer Science + Business Media, New York, 1987), pp. 326-382.

Prewitt et al., "FIB Repair of 5X Reticles and Effects on IC Quality," Integrated Circuit Metrology, Inspection, and Process Control VII, Proc. SPIE vol. 1926 (1993), pp. 517-526.

Prewitt et al., "Focused ion beam repair: staining of photomasks and reticles," J. Phys. D Appl. Phys. vol. 26 (1993), pp. 1135-1137.

Prewitt et al., "Gallium Staining in FIB Repair of Photomasks," Microelectronic Engineering, vol. 21 (1993), pp. 191-196.

Pushie et al., "Elemental and Chemically Specific X-ray Fluorescence Imaging of Biological Systems," Chem. Rev. 114:17, 8499-8541 (2014).

Pushie et al., "Prion protein expression level alters regional copper, iron and zinc content in the mouse brain," Metallomics vol. 3, 206-214 (2011).

Qiao et al., "Single-shot x-ray phase-contrast and dark-field imaging based on coded binary phase mask," Appl. Phys. Lett. 119, 011105 (2021).

Qin et al., "Trace metal imaging with high spatial resolution: Applications in biomedicine," Metallomics, vol. 3 (Jan. 2011), pp. 28-37.

Redus et al., "Spectrometer configuration and measurement uncertainty in X-ray spectroscopy," X-Ray Spectrom., pp. 1-14 (2020).

Renaud et al., "Probing surface and interface morphology with Grazing Incidence Small Angle X-ray Scattering," Surface Science Reports, vol. 64:8 (2009), pp. 255-380.

Riege, "Electron Emission from Ferroelectrics—A Review", CERN Report CERN AT/93-18 (Cern, Geneva, Switzerland, Jul. 1993).

Rix et al., "Super-Resolution X-ray phase-contrast and dark-field imaging with a single 2D grating and electromagnetic source stepping," Phys. Med. Biol. In press https://doi.org/10.1088/1361-6560/ab2ff5 (2019).

Rutishauser, "X-ray grating interferometry for imaging and metrology," 2003, Eth Zurich, Diss. ETH No. 20939.

Sato et al., Two-dimensional gratings-based phase-contrast imaging using a conventional x-ray tube, 2011, Optics Letters, vol. 36, No. 18, pp. 3551-3553.

Scherer et al., "Bi-Directional X-Ray Phase-Contrast Mammography," PLoS ONE, vol. 9, Issue 5 (May 2014) e93502.

Scholz, "X-ray Tubes and Monochromators," Technical Workshop EPIC, Universität Würzburg (2007); 41 slides, 2007.

Scholze et al., "X-ray Detectors and XRF Detection Channels," Ch. 4 of "Handbook of Practical X-|Ray Fluorescence Analysis," B. Beckhoff et al., eds. (Springer, Berlin Heidelberg, Germany, 2006), pp. 85-198.

Schunck et al., "Soft x-ray imaging spectroscopy with micrometer resolution," Optica vol. 8, No. 2, pp. 156-160 (2021).

Seddon-Ferretti et al., "HERMES—a GUI-based software tool for pre-processing of X-ray absorption spectroscopy data from laboratory Rowland circle spectrometers," J. Synch. Rad., vol. 29, https://doi.org/10.1107/S1600577521012583, pp. 1-4 (2022).

Sefi et al., "25-Fold Resolution Enhancement of X-ray Microscopy Using Multipixel Ghost Imaging," arXiv:2402.14023 (2024).

Seifert et al., "Talbot-Lau x-ray phase-contrast setup for fast scanning of large samples," Sci. Rep. 9:4199, pp. 1-11 (2019).

Shi et al., "Laboratory X-ray interferometry imaging with a fan-shaped source grating," Optics Lett., doi.org/10.1364/OL.426867 (2021).

Shimamura et al., "Soft X-ray nanobeams formed by aberration-reduced elliptical mirrors with large numerical aperture," Opt. Express, vol. 31, No. 23, 38132 (2023).

Shimura et al., "Hard x-ray phase contrast imaging using a tabletop Talbot-Lau interferometer with multiline embedded x-ray targets", Opt. Lett. vol. 38(2) (2013), pp. 157-159.

Simionovici et al., "X-ray focusing methods for X-ray absorption spectroscopy," Int'l Tables Crystallog. vol. I, https://doi.org/10.1107/S1574870721006844 (2022).

Six et al., "Joint multi-contrast CT for edge illumination X-ray phase contrast imaging using split Barzilai-Borwein steps," Op. Express, vol. 32, No. 2, pp. 1135-1150 (2024).

Soltau et al., "Coherent Diffractive Imaging with Diffractive Optics," Phys. Rev. Lett. 128, 223901 (2022).

Sparks Jr., "X-ray Fluorescence Microprobe for Chemical Analysis," in Synchrotron Radiation Research, H. Winick & S. Doniach, eds. (Plenum Press, New York, NY 1980), pp. 459-512.

Stampanoni et al., "The First Analysis and Clinical Evaluation of Native Breast Tissue Using Differential Phase-Contrast Mammography," Investigative Radiology, vol. 46, pp. 801-806. pub 2011-12-xx.

Storm et al., "Optimizing the energy bandwidth for transmission full-field X-ray microscopy experiments," J. Synch. Rad., vol. 29, https://doi.org/10.1107/S1600577521011206, pp. 1-10 (2022).

Streli et al., "Micro-X-ray fluorescence spectroscopy," Chapter 1.9.f of "Imaging Modalities for Biological and Preclinical Research: A

(56) References Cited

OTHER PUBLICATIONS compendium, vol. 1, Part I: Ex vivo biological imaging," Ed. Walter et al., 8 pages, doi:10.1088/978-0-7503-3059-6ch42 (2021).
Stupple et al., "Modeling of Heat Transfer in an Aluminum X-Ray Anode Employing a Chemical Vapor Deposited Diamond Heat Spreader," J. Heat Transfer, Vo. 140, 124501-1-5 (Dec. 2018).
Su et al., "Quantitative Dual-Energy X-ray Imaging Based on K-Edge Absorption Difference," J. Phys. Chem. Lett. vol. 14, pp. 10074-10079 (2023).
Sunday et al., "X-ray Metrology for the Semiconductor Industry Tutorial," J. Res. Nat'l Inst. Stan. vol. 124: 124003 (2019); https://doi.org/10.6028/jres.124.003.
Takeda et al., "Differential Phase X-ray Imaging Microscopy with X-ray Talbot Interferometer" Appl. Phys. Express vol. 1 (2008) 117002.
Takeda et al., "X-Ray Phase Imaging with Single Phase Grating", Jpn. J. Appl. Phys. vol. 46 (2007), pp. L89-L91.
Talbot, "Facts relating to optical science No. IV," Philos. Mag. vol. 9 (1836), pp. 401-407.
Tanaka et al., "Cadaveric and in vivo human joint imaging based on differential phase contrast by X-ray Talbot-Lau interferometry", Z. Med. Phys. vol. 23 (2013), pp. 222-227.
Tanaka et al., "Propagation-based phase-contrast imaging method for full-field X-ray microscopy using advanced Kirkpatrick-Baez mirrors," Op. Express vol. 31, No. 16, pp. 26135-26144 (2023).
Tang et al., "Detailed analysis of the interference patterns measured in lab-based X-ray dual-phase grating interferometry through wave propagation simulation," Opt. Ex. vol. 31, No. 2, pp. 1677-1691 (2023).
Tao et al., "Factors Affecting the Spatial Resolution in 2D Grating-Based X-Ray Phase Contrast Imaging," Frontiers in Physics, doi: 10.3389/fphy.2021.672207 (2021).
Tao et al., "Moire artifacts reduction in Talbot-Lau X-ray phase contrast imaging using a three-step iterative approach," Opt. Ex. vol. 30, No. 20, pp. 35096-35111 (2022).
Taphorn et al., "Grating-based spectral X-ray dark-field imaging for correlation with structural size measures," Sci. Reports, vol. 10, 13195 (2020).
Tebina et al., "X-Ray Fault Injection: Reviewing Defensive Approaches from a Security Perspective," 2022 IEEE Int'l Symp. Defect and Fault Tolerances in VLSI and Nanotechnology Systems (DFT), doi: 10.1109/DFT56152.2022.9962362 (2022).
Terzano et al., Recent advances in analysis of trace elements in environmental samples by X-ray based techniques (IUPAC Technical Report), Pure Appl. Chem. 2019.
Tessarini et al., "Semi-classical Monte Carlo algorithm for the simulation of X-ray grating interferometry," Sci. Rep. vol. 12, p. 2485 (2022).
Tetef et al., "Unsupervised Machine Learning for Unbiased Chemical Classification in X-ray Absorption Spectroscopy and X-ray Emission Spectroscopy," Royal Soc. of Chem. Doi: 10.33774/chemrxiv-2021-5tvrv (2021).
Titus et al., "Advancing the in-situ characterization of light elements via X-ray absorption spectroscopy using superconducting detectors," Microsc. Microanal., vol. 27, (Suppl. 1), p. 2890 (2021).
Tkachuk et al., "High-resolution x-ray tomography using laboratory sources", in Developments in X-Ray Tomography V, Proc. SPIE 6318 (2006): 631810.
Tkachuk et al., "Multi-length scale x-ray tomography using laboratory and synchrotron sources", Microsc. Microanal. vol. 13 (Suppl. 2) (2007), pp. 1570-1571.
Topperwien et al., "Multiscale x-ray phase-contrast tomography in a mouse model of transient focal cerebral ischemia," Biomed. Op. Express, vol. 10, No. 1, Jan. 2019, pp. 92-103.
Tsuji et al., "X-Ray Spectrometry: Recent Technological Advances," John Wiley & Sons Ltd. Chichester, West Sussex, UK 2004), Chapters 1-7.
Tucker, "Design of X-Ray Source for Real-Time Computed Tomography," Dissertation, Missouri Univ. of Sci. and Tech., Scholars' Mine, 104 pages (2020).

Udagawa, "An Introduction to In-House EXAFS Facilities," The Rigaku Journal, vol. 6, (1) (1989), pp. 20-27.
Udagawa, "An Introduction to X-ray Absorption Fine Structure," The Rigaku Journal, vol. 11(2)(1994), pp. 30-39.
Uehara et al., "Effectiveness of X-ray grating interferometry for non-destructive inspection of packaged devices", J. Appl. Phys. vol. 114 (2013), 134901.
Viermetz et al., "High resolution laboratory grating-based X-ray phase-contrast CT," Scientific Reports 8:15884 (2018).
Vila-Comamala et al., "High sensitivity X-ray phase contrast imaging by laboratory grating-based interferometry at high Talbot order geometry," Op. Express vol. 29, No. 2, pp. 2049-2064 (2021).
Villarraga-Gómez et al., "Assessing Electronic Devices with Advanced 3D X-ray Imaging and Electron Microscopy" (2023).
Vogt, "X-ray Fluorescence Microscopy: A Tool for Biology, Life Science and Nanomedicine," Presentation on May 16, 2012 at James Madison Univ., Harrisonburg, VA (31 slides), 2012.
Wan et al., "Fabrication of Multiple Slit Using Stacked-Sliced Method for Hard X-ray Talbot-Lau Interferometer", Jpn. J. Appl. Phys. vol. 47 (2008), pp. 7412-7414.
Wang et al., "Advantages of intermediate X-ray energies in Zernike phase contrast X-ray microscopy," Biotech. Adv., vol. 31 (2013) pp. 387-392.
Wang et al., "High beam-current density of a 10-keV nano-focus X-ray source," Nucl. Inst. And Meth. A940, 475-478 (2019).
Wansleben et al., "Photon flux determination of a liquid-metal jet x-ray source by means of photon scattering," arXiv:1903.06024v1, Mar. 14, 2019.
Watts et al., "The development of laboratory-based high energy sources for XPS," Surf. Interface Anal., pp. 1-17, doi:10.1002/sia.7300 (2023).
Weitkamp et al., "Design aspects of X-ray grating interferometry," in International Workshop on X-ray and Neutron Phase Imaging with Gratings AIP Conf. Proc. vol. 1466, (2012), pp. 84-89.
Weitkamp et al., "Hard X-ray phase imaging and tomography with a grating interferometer," Proc. SPIE vol. 5535, (2004), pp. 137-142.
Weitkamp et al., "X-ray wavefront diagnostics with Talbot interferometers," International Workshop on X-Ray Diagnostics and Scientific Application of the European XFEL, Ryn, Poland, (2010), 36 slides.
Weitkamp et al., Tomography with grating interferometers at low-brilliance sources, 2006, SPIE, vol. 6318, pp. OS-1 to OS-10.
Weitkamp et al., "X-ray phase imaging with a grating interferometer," Opt. Express vol. 13(16), (2005), pp. 6296-6304.
Weitkamp et al., "X-ray wavefront analysis and optics characterization with a grating interferometer," Appl. Phys. Lett. vol. 86, (2005), 054101.
Wen et al., "Fourier X-ray Scattering Radiography Yields Bone Structural Information," Radiology, vol. 251 (2009) pp. 910-918.
Wen et al., "Single-shot x-ray differential phase-contrast and diffraction imaging using two-dimensional transmission gratings," Op. Lett. vol. 35, No. 12, (2010) pp. 1932-1934.
Wilde et al., "Modeling of an X-ray grating-based imaging interferometer using ray tracing," Op. Express vol. 28, No. 17, p. 24657 (2020).
Wilde et al., "Statistical optics modeling of dark-field scattering in X-ray grating interferometers: Part 1. Theory," Op. Express vol. 29, No. 25, p. 40891 (2021).
Wilde et al., "Statistical optics modeling of dark-field scattering in X-ray grating interferometers: Part 2. Simulation," Op. Express vol. 29, No. 25, p. 40917 (2021).
Wirtensohn et al., "The Dark Side of Transmission X-Ray Microscopy," arXiv:2403.18884v1 [physics.optics[ Mar. 27, 2024.
Withers et al., "X-ray computed tomography," Nature Reviews | Methods Primers, vol. 1, No. 18, pp. 1-21 (2021).
Witte et al., "From 2D Stxm to 3D Imaging: Soft X-ray Laminography of Thin Specimens," Nano Lett. vol. 20, pp. 1305-1314 (2020).
Wittry et al., "Properties of fixed-position Bragg diffractors for parallel detection of x-ray spectra," Rev. Sci. Instr. vol. 64, pp. 2195-2200 (1993).

(56) References Cited

OTHER PUBLICATIONS

Wobrauschek et al., "Energy Dispersive, X-Ray Fluorescence Analysis," Encyclopedia of Analytical Chemistry, R.A. Meyers, Ed. (Wiley 2010).
Wobrauschek et al., "Micro XRF of light elements using a polycapillary lens and an ultra-thin window Silicon Drift Detector inside a vacuum chamber," 2005, International Centre for Diffraction Data 2005, Advances in X-ray Analysis, vol. 48, pp. 229-235.
Woicik et al., "Soft X-ray absorption spectra," Int. Tables Crystallogr. vol. 1, https://doi.org.10.1107/S1574870720008484 (2023).
Xiao et al., "TXM-Sandbox: an open-source software for transmission X-ray microscopy data analysis," J. Synch. Rad., vol. 29, https://doi.org/10.1107/S1600577521011978, p. 1-10 (2022).
Xu et al., "Comparison of image quality in computed laminography and tomography," Op. Express, vol. 20, No. 2, pp. 794-806 (2012).
Xu et al., "Synchrotron radiation computed laminography for polymer composite failure studies," J. Synch. Rad., vol. 17, pp. 222-226 (2010).
Yamada et al., "Compact full-field hard x-ray microscope based on advanced Kirkpatrick-Baez mirrors," Optica, vol. 7, No. 4 pp. 367-370 (2020).
Yamamoto, "Fundamental physics of vacuum electron sources", Reports on Progress in Physics vol. 69, (2006), pp. 181-232.
Yan et al., "X-ray source design optimization using differential evolution algorithms—A case study," Rev. Sci. Instrum. 93, 053101 (2022).
Yang et al., "Effective focal spot measurement method for X-ray source based on the dynamic translation of a light barrier," Op. Express vol. 32, No. 31, pp. 2982-3005 (2024).
Yashiro et al., "Distribution of unresolvable anisotropic microstructures revealed in visibility-contrast images using x-ray Talbot interferometry", Phys. Rev. B vol. 84 (2011), 094106.
Yashiro et al., "Hard x-ray phase-imaging microscopy using the self-imaging phenomenon of a transmission grating", Phys. Rev. A vol. 82 (2010), 043822.
Yashiro et al., "Theoretical Aspect of X-ray Phase Microscopy with Transmission Gratings" in International Workshop on X-ray and Neutron Phase Imaging with Gratings, AIP Conf. Proc. vol. 1466, (2012), pp. 144-149.
Yashiro et al., "X-ray Phase Imaging and Tomography Using a Fresnel Zone Plate and a Transmission Grating", in "The 10th International Conference on X-ray Microscopy Radiation Instrumentation", AIP Conf. Proc. vol. 1365 (2011) pp. 317-320.
Yashiro et al., "Efficiency of capturing a phase image using cone-beam x-ray Talbot interferometry", J. Opt. Soc. Am. A vol. 25 (2008), pp. 2025-2039.
Yashiro et al., "On the origin of visibility contrast in x-ray Talbot interferometry", Opt. Express (2010), pp. 16890-16901.
Yashiro et al., "Optimal Design of Transmission Grating for X-ray Talbot Interferometer", Advances in X-ray Analysis vol. 49(3) (2006), pp. 375-379.
Yashiro et al., "X-ray Phase Imaging Microscopy using a Fresnel Zone Plate and a Transmission Grating", in The 10th International Conference on Synchrotron Radiation Instrumentation, AIP Conf. Proc. vol. 1234 (2010), pp. 473-476.
Yashiro et al., "Hard-X-Ray Phase-Difference Microscopy Using a Fresnel Zone Plate and a Transmission Grating", Phys. Rev. Lett. vol. 103 (2009), 180801.
Yoshioka et al., "Imaging evaluation of the cartilage in rheumatoid arthritis patients with an x-ray phase imaging apparatus based on Talbot-Lau interferometry," Scientific Reports, 10:6561, https://doi.org/10.1038/s41598-020-63155-9 (2020).
Yuan at al., "Micro X-ray fluorescence device based on monocapillary ellipsoidal lens for thin film thickness measurements," Nucl. Inst. Meth. Phys. Res. A, vol. 1058, p. 168923 (2024).
Zan et al., "High-resolution multicontrast tomography with an X-ray microarray anode-structured target source," PNAS, doi.org10.1073/pnas.2103126118 (2021).
Zanette et al., "Two-Dimensional X-Ray Grating interferometer," Phys. Rev. Lett. Vol. 105 (2010) pp. 248102-1 248102-4.
Zeeshan et al., "In-house setup for laboratory-based x-ray absorption fine structure spectroscopy measurements," Rev. Sci. Inst. 90, 073105 (2019).
Zeng et al., "Glass Monocapillary X-ray Optics and Their Applications in X-Ray Microscopy," X-ray Optics and Microanalysis: Proceedings of the 20th International Congress, AIP Conf. Proc. vol. 1221, (2010), pp. 41-47.
Zhan et al., "A Lightweight Method for Detecting IC Wire Bonding Defects in X-ray Images," Micromachines, vol. 14, p. 1119, https://doi.org/10.3390/mi14061119 (2023).
Zhang et al., "Application of confocal X-ray fluorescence based on capillary X-ray optics in nondestructively measuring the inner diameter of monocapillary optics," Optics Comm. (2018) https://doi.org/10.1016/j.optcom.2018.11.064.
Zhang et al., "Hard X-ray projection imaging below 5 nm resolution," https://doi.org/10.21203/rs.3.rs-4093473/v1 (2024).
Zhang et al., "Laboratory-scale X-ray absorption spectrometer with a cylindrical Johansson crystal analyzer," Nuclear Inst. And Methods in Physics Research, A (2023), doi: https://doi.org/10.1016/j.nima.2023.168067 (2023).
Zhang et al., "Measurement of the inner diameter of monocapillary with confocal X-ray scattering technology based on capillary X-ray optics," Appl. Opt. (Jan. 8, 2019), doc ID 351489, pp. 1-10.
Zhao et al., "Applications of the non-negative least-squares deconvolution method to analyze energy-dispersive x-ray fluorescence spectra," Appl. Op., Vo 62, No. 20, pp. 5556-5564 (2023).
Zhao et al., "X-ray wavefront sensing and optics metrology using a microfocus x-ray grating interferometer with electromagnetic phase stepping," Appl. Phys. Lett. 120, 181105 (2022).
Zhou et al., "A study of new type electric field modulation multi-target X-ray source," Nucl. Inst. and Methods in Physics Research A, https://doi.org/10.1016/j.nima.2020.164342 (2020).
Zhou et al., "X-ray wavefront characterization with grating interferometry using an x-ray microfocus laboratory source," Proceedings, vol. 11492, Advances in Metrology for X-Ray and EUV Optics IX; 114920Q, https://doi.org/10.1117/12.2576152 (2020).
Zhu et al., "Optical Wafer Defect Inspection at the 10 nm Technology Node and Beyond," 2022 Int. Extrem. Manuf. In press https://doi.org/10.1088/2631-7990/ac64d7 (2022).

* cited by examiner

SECONDARY IMAGE REMOVAL USING HIGH RESOLUTION X-RAY TRANSMISSION SOURCES

CLAIM OF PRIORITY

This application claims the benefit of priority to U.S. Provisional Appl. No. 63/581,225 filed Sep. 7, 2023, which is incorporated in its entirety by reference herein.

BACKGROUND

Field

This application relates generally to transmission x-ray sources and x-ray imaging systems.

Description of the Related Art

In high resolution transmission x-ray sources, a physical aperture can be used to reduce the area of the x-ray target impinged (e.g., bombarded) by the electron beam. Such apertures can occlude a portion of the electron beam from reaching the x-ray target, allowing the x-ray sources to achieve electron beam spots with submicron diameters at the x-ray target. For example, FIG. 1 schematically illustrates a cross-sectional view of a conventional transmission x-ray source 10 with an aperture 12 and an electron beam 14 propagating along an electron beam propagation axis 15 and impinging an x-ray target 16 on an x-ray window 18. A first portion 14a of the electron beam 14 propagates through the hole of the aperture 12 to impinge the x-ray target 16, generating primary x-rays 20 from the x-ray target 16 that propagate out of the x-ray source 10 through the x-ray window 18. A second portion 14b of the electron beam 14 impinges the solid portion of the aperture 12 and is prevented from impinging the x-ray target 16. However, by impinging the solid portion of the aperture 12, the second portion 14b of the electron beam 14 can generate secondary x-rays 22 (e.g., generated directly by the electron beam 14 impinging the solid portion of the aperture 12). Additional secondary x-rays 22 can be generated by backscattered electrons from the x-ray target 16 impinging the solid portion of the aperture 12. The angular distribution of the secondary x-rays 22 emanating from the x-ray source 10 can be narrower than the angular distribution of the primary x-rays 20 emanating from the x-ray source 10. In x-ray imaging using such an x-ray source 10, the secondary x-rays 22 can create a "secondary image" of a sample in the center of a tomography dataset, the smaller secondary image superimposed upon a larger volume of the "primary image."

Although the secondary image exists in most high-resolution x-ray sources with an aperture 12 and microns-scale focus (e.g., spot size or width greater than or equal to 2 microns), the secondary image can be particularly pronounced for x-ray sources 10 with submicron focal spot sizes or widths (e.g., less than 1 micron) because the metal x-ray target 16 (e.g., tungsten film) that generates the primary x-rays 20 can be thin (e.g., thickness in a range of 500 nanometers to 2 microns). When such x-ray sources 10 are operated at higher accelerating voltages, most of the electrons are too energetic to strongly interact with the thin metal x-ray target 16 and the primary x-ray generation is low, leading to a higher secondary-to-primary ratio. Furthermore, when such x-ray sources 10 are operated with smaller apertures for smaller spot sizes, more x-rays can be intercepted by the aperture 12 which also leads to higher secondary-to-primary ratios. For example, secondary x-rays 22 can be up to 20% of the total x-rays, resulting in significant degradation to image quality. These secondary x-rays 22 can also degrade the resolution of the x-ray imaging system.

External apertures can be used with larger spot size x-ray sources (e.g., spot size greater than or equal to 2 microns) to remove (e.g., block) these secondary x-rays 22. However, such external apertures are not used for most high resolution applications since (i) an external aperture can increase the source-to-sample distances resulting in lower throughput and (ii) the increase of the minimum source-to-sample distance can result in larger overall system lengths to achieve higher resolution (e.g., to achieve geometric magnifications of 1000×, a minimum 2-millimeter source-to-sample distance would have an overall system length over 2 meters, while a 1-millimeter source-to-sample distance would have an overall system length over 1 meter).

X-ray source manufacturers have devised solutions that utilize "beam blanking" by moving an electron beam 14 over an edge separating two regions of a structured x-ray target 16 that have different capacities to generate x-rays 20 (see, e.g., U.S. Pat. No. 10,784,069) and generating a separate "secondary" beam image to subtract the contribution to the image from the secondary x-rays 22. However, such solutions also have challenges. For example, this approach often sweeps the electron beam 14 between a tungsten target region and a low atomic number (e.g., diamond; beryllium) non-target region. Because the amount of secondary x-rays 22 resulting from backscattered electrons from the x-ray target 16 can be dependent on the target material being impinged, the target and non-target regions will not have 1:1 equivalence with regard to secondary x-rays 22. Furthermore, the deflection of the electron beam 14 from the target region to the non-target region can cause differences in the positions from which secondary x-rays 22 are produced and in the amounts of secondary x-rays 22 that are produced. In addition, the profiles of the electron beam 14 on the metal target layer 16 and a deflected electron beam 14 on the low Z non-target material can be different, resulting in differences that cannot be subtracted in a straightforward manner. In such cases, the image created by the secondary x-rays 22, while reduced, can still remain and cause problems.

Moreover, the secondary x-ray problem can be exacerbated by using standard x-ray detectors. Most micro-computed tomography ("microCT") imaging systems use detectors with pixel sizes in a range of about 50 microns to 100 microns (e.g., flat panel detectors). Due to the large pixel sizes of these detectors, to achieve high resolution imaging, the detector is used at a large distance from the x-ray source 10 (e.g., the detector at least 100 millimeters from the sample to achieve 0.5-micron resolution for a 50-micron detector pixel). At small distances from the x-ray source 10 (e.g., less than 10 millimeters), the ratio of secondary x-rays 22 to primary x-rays 20 is low, but the ratio of secondary x-rays 22 to primary x-rays 20 increases as the detector is moved to larger distances from the x-ray source 10.

SUMMARY

In one aspect disclosed herein, an apparatus comprises a transmission x-ray source and an x-ray detector system. The transmission x-ray source comprises a window comprising a target layer of at least one x-ray generating material configured to generate x-rays in response to bombardment by electrons. The transmission x-ray source further comprises an internal aperture configured to allow a first portion of an electron beam from an electron beam source to bombard the target layer and to block a second portion of the electron beam from bombarding the target layer. The first portion of the electron beam has a full-width-at-half-maximum width at the target layer less than or equal to 1 micron. The window is spaced from the internal aperture by a first distance $D_1$. The x-ray detector system comprises a scintillator configured to receive x-rays from the x-ray source that have propagated through a sample and to respond to the received x-rays by generating visible light. The x-ray detector system further comprises an optical assembly configured to receive the visible light from the scintillator. The x-ray detector system further comprises at least one image sensor configured to receive and respond to the visible light from the optical assembly by generating electrical signals. The x-ray detector system further comprises a motorized stage configured to controllably adjust a position of the scintillator such that the scintillator is spaced from the window by a second distance $D_2$, wherein $D_2^2/(D_1+D_2)^2$ is less than 0.2.

In another aspect disclosed herein, an apparatus comprises an x-ray source, a sample stage configured to support and controllably move a sample, and at least one x-ray detector. The x-ray source comprises an electron beam source configured to generate an electron beam, at least one aperture, at least one target, and a window. The at least one aperture is configured to allow a first portion of the electron beam to propagate through the at least one aperture and to block a second portion of the electron beam from propagating through the at least one aperture. The at least one target comprises at least one x-ray generating material configured to generate a first diverging x-ray beam in response to bombardment by the first portion of the electron beam. The at least one aperture is configured to generate a second diverging x-ray beam in response to bombardment by the second portion of the electron beam and/or by electrons backscattered from the at least one target. The window is configured to emit the first x-ray beam and the second x-ray beam, both the first x-ray beam and the second x-ray beam substantially centered on an x-ray axis that is substantially perpendicular to an outer surface of the window. The at least one x-ray detector is configured to receive x-rays of the first x-ray beam transmitted from the x-ray source and through a region-of-interest of the sample along a central beam axis, the central beam axis and the x-ray axis having an angle Φ greater than or equal to 6 degrees therebetween.

In another aspect disclosed herein, an apparatus comprises a transmission x-ray source configured to generate a primary x-ray beam having a first cone angle $\Theta_1$ and a secondary x-ray beam having a second cone angle $\Theta_2$ less than the first cone angle $\Theta_1$, both the primary x-ray beam and the secondary x-ray beam diverging and symmetric about an x-ray axis. The apparatus further comprises a sample stage configured to support and controllably move a sample. The apparatus further comprises at least one x-ray detector having a region configured to receive x-rays transmitted from the transmission x-ray source and through a region-of-interest of the sample along a beam axis at a non-zero angle Φ relative to the x-ray axis. The at least one x-ray detector is configured to generate electrical signals indicative of the x-rays received at the region.

In another aspect disclosed herein, an apparatus comprises an electron beam source configured to generate an electron beam, an aperture, and a target. The aperture comprises a first solid portion comprising at least one first atomic element having a first atomic number greater than 20 (e.g., at least 50% of the first solid portion is the at least one first atomic element), a hole extending through the first portion, and a second solid portion overlaying at least one surface of the first solid portion (e.g., at least one layer coated onto a first surface region facing towards the electron beam source, a second surface region extending at least partly into the hole, and/or a third surface region facing away from the electron beam source). The second solid portion comprises at least one second atomic element having a second atomic number less than 15 (e.g., at least 50% of the second solid portion is the at least one second atomic element; configured to block at least 50% of an electron flux impinging the second solid portion from reaching the first solid portion). The target is configured to generate x-rays in response to being impinged by electrons of the electron beam. The aperture is configured to allow a first portion of the electron beam to propagate through the hole to impinge the target and to occlude a second portion of the electron beam from propagating through the hole. The second portion of the electron beam impinges the second solid portion. In certain aspects, the apparatus can further include a vacuum chamber containing a vacuum region, the electron beam source configured to transmit the electron beam into the vacuum region, the vacuum chamber containing the electron beam source, the aperture, and the target. For example, the vacuum chamber can comprise a window separating the vacuum region from a non-vacuum region outside the vacuum chamber, the window consisting essentially of one or more atomic elements having atomic numbers less than 15, the target comprising at least one metal layer in thermal communication with a surface of the window that is facing the vacuum region.

DETAILED DESCRIPTION

Certain implementations described herein provide various hardware approaches to reduce (e.g., remove) the secondary image produced by secondary x-rays from a high resolution transmission x-ray source.

Figure 1:
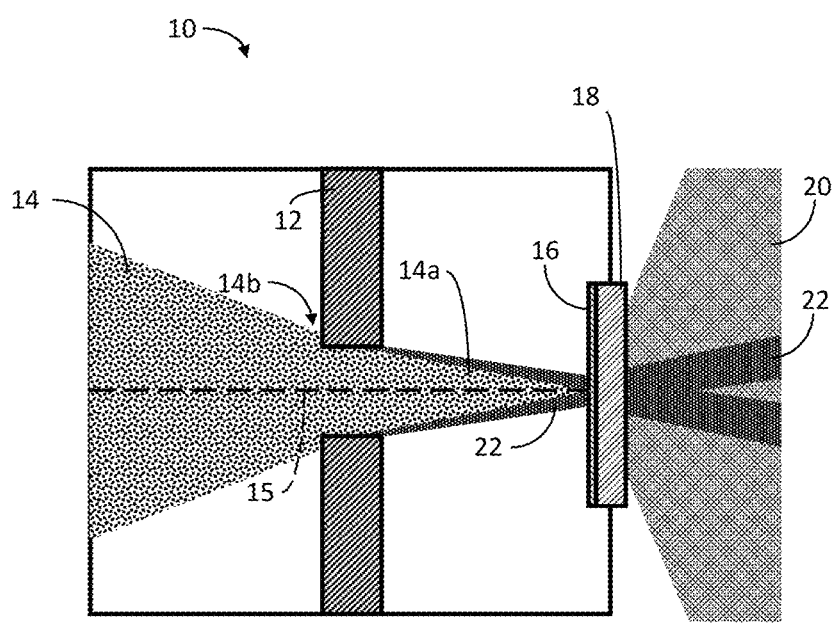
FIG. 1 schematically illustrates a cross-sectional view of a conventional transmission x-ray source with an aperture and an electron beam impinging an x-ray target on an x-ray window.
Figure 2A:
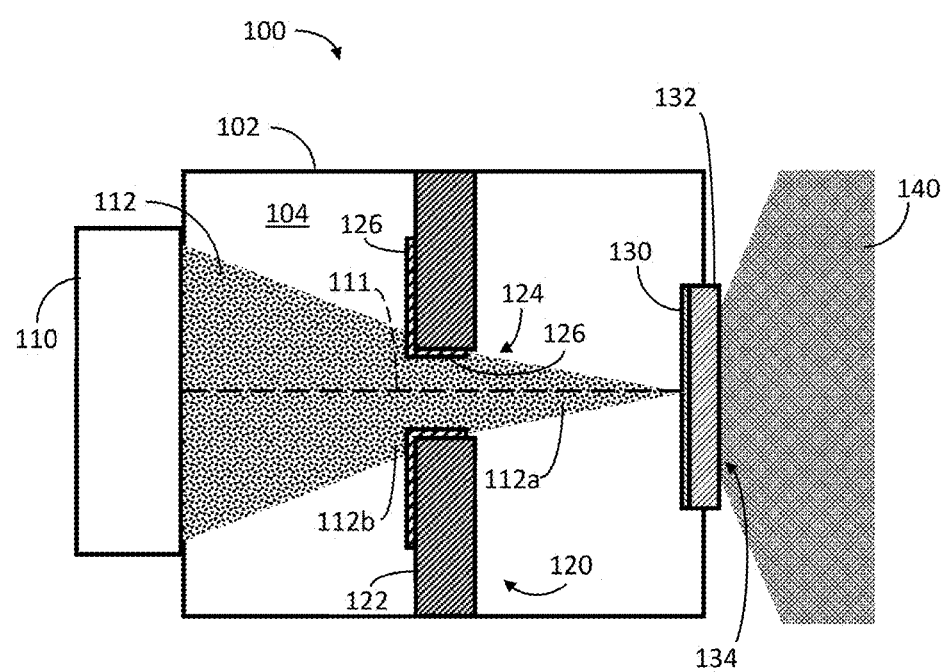
FIGS. 2A and 2B schematically illustrate cross-sectional views of two examples of a transmission x-ray source in accordance with certain implementations described herein.
Figure 2B:
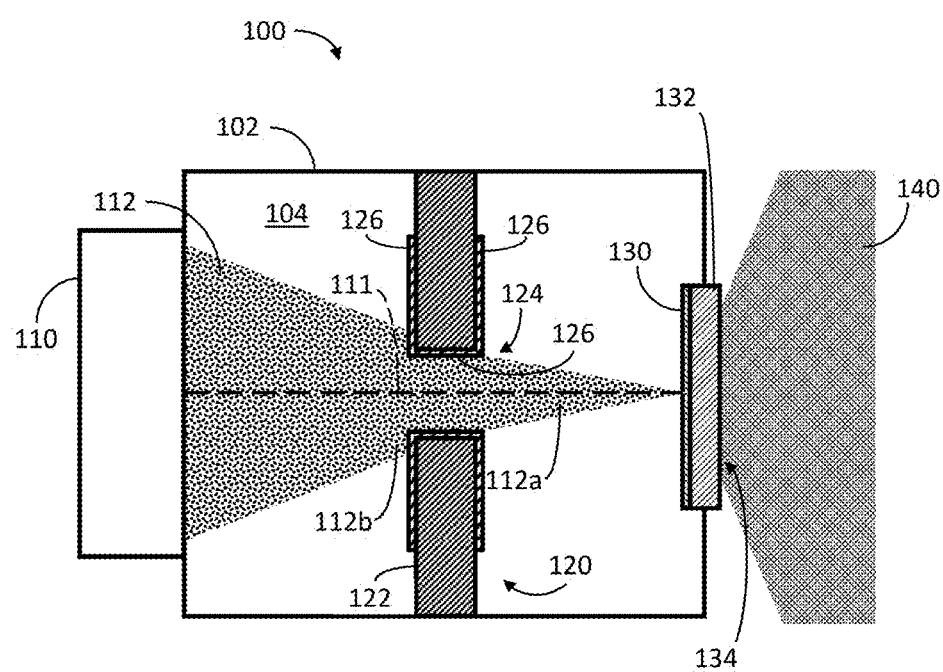

FIGS. 2A-2B schematically illustrate cross-sectional views of two examples of a transmission x-ray source 100 in accordance with certain implementations described herein. The example x-ray source 100 comprises an electron beam source 110 configured to generate an electron beam 112 (e.g., propagating along an electron beam propagation axis 111), an aperture 120, and a target 130 configured to generate x-rays 140 in response to being impinged (e.g., bombarded) by electrons of the electron beam 112. The aperture 120 comprises a first portion 122 comprising at least one first atomic element having a first atomic number greater than 20 (e.g., greater than 40), a hole 124 extending through the first portion 122, and a second portion 126 overlaying at least one surface of the first portion 122, the second portion 126 comprising at least one second atomic element having a second atomic number less than 15. The aperture 120 is configured to allow a first portion 112a of the electron beam 112 to propagate through the hole 124 to impinge the target 130. The aperture 120 is further configured to occlude (e.g., block; inhibit; prevent) a second portion 112b of the electron beam 112 from propagating through the hole 124, the second portion 112b impinging the second portion 126.

In certain implementations, the x-ray source 100 comprises a vacuum chamber 102 (e.g., vacuum-sealed tube) containing a vacuum region 104 and the electron beam source 110 is configured to transmit the electron beam 112 into the vacuum region 104. In certain implementations, the vacuum chamber 102 contains the electron beam source 110, the aperture 120, and the target 130. In contrast to open-tube x-ray sources, the vacuum chamber 102 of certain implementations is not actively pumped.

In certain implementations, the electron beam source 110 comprises a cathode configured to emit electrons and electron optics (e.g., electrodes; electromagnetic focusing column) configured to direct the electrons into the electron beam 112 (e.g., using accelerating voltages in a range of 30 kVp to 160 kVp) and to direct the electron beam 112 towards the target 130 (e.g., to focus the electron beam 112 at the target 130). For example, the electron beam source 110 can be configured to generate the focused electron beam 112 and to bombard the target 130 with the focused electron beam 112 with a selectable maximum accelerating voltage at the target 130 in a range from 10 kVp to 250 kVp. The electron beam spot size (e.g., FWHM; width; diameter) at the target 130 (e.g., the x-ray generating spot size) can be less than 2 microns (e.g., in a range of 0.3 micron to 1 micron; less than 1 micron; less than 0.6 micron; less than 0.5 micron; less than 0.3 micron).

In certain implementations, the target 130 is within the vacuum region 104 and is configured to generate diverging x-rays 140 in response to bombardment by electrons of the electron beam 112. The target 130 comprises at least one x-ray generating material selected for its x-ray spectral production properties (e.g., characteristic x-ray energy) and/or other properties (e.g., atomic number Z; electron density) that affect the x-ray production capability of the at least one x-ray generating material. The at least one x-ray generating material can have a sufficiently high thermal conductivity to dissipate heat generated by bombardment by electron beams 112 with high power. The at least one x-ray generating material can have a thermal conductivity greater than or equal to 100 W/mK and/or a melting point greater than 1000° C. (e.g., greater than 2000° C.). Examples of x-ray generating materials include but are not limited to: Cr, Fe, Co, Ni, Cu, W, Rh, Mo, Au, Pt, Ag, $SrB_6$, $LaB_6$, $CeB_6$, other materials containing atomic elements with atomic numbers greater than or equal to 40.

As shown schematically in FIGS. 2A-2B, the target 130 can be affixed to (e.g., integrated with; a component of; in contact with) a vacuum window 132 of the vacuum chamber 102, the vacuum window 132 separating the vacuum region 104 from a non-vacuum region outside the vacuum chamber 102. For example, the target 130 can comprise at least one metal layer in thermal communication with (e.g., affixed to; deposited on) a surface of the vacuum window 132 that is facing the vacuum region of the vacuum chamber 102, and the vacuum window 132 can be connected to electrical ground. The thickness of the at least one x-ray generating material of the target 130 (e.g., along a direction substantially perpendicular to an outer surface 134 of the vacuum window 132) can be less than 15 microns (e.g., in a range of 0.1 micron to 10 microns; in a range of 2 microns to 5 microns; in a range of 0.2 micron to 3 microns; in a range of 0.5 micron to 2 microns; in a range of 200 nanometers to 500 nanometers) and the thickness of the vacuum window 132 in the direction substantially perpendicular to the outer surface 134 of the vacuum window 132 can be in a range of 0.05 millimeter to 3 millimeters. The thickness of the at least one x-ray generating material can be configured to optimize for high spatial resolution (e.g., by minimizing electron beam scatter inside material) and/or for high system throughput (e.g., maximizing electron energy deposition inside the at least one x-ray generating material). In certain implementations, the at least one x-ray generating material has a plurality of regions that can be bombarded by the electron beam 112 (e.g., by translating the electron beam focus), each region having a corresponding thickness along a direction substantially perpendicular to the outer surface 134 of the vacuum window 132. The electron beam 112 can be directed by the electron beam source 110 to bombard a selected region with a corresponding thickness that provides a selected tradeoff between throughput and resolution.

In certain implementations, the vacuum window 132 consists essentially of atomic elements having atomic numbers (Z) less than 15 and is substantially transmissive to higher energy x-rays generated by the at least one x-ray generating material of the target 130. For example, the vacuum window 132 can have a sufficiently high thermal conductivity to provide a thermal conduit to prevent thermal damage (e.g., melting) of the at least one x-ray generating material of the target 130 (e.g., one or more materials of the vacuum window 132 selected from the group consisting of: beryllium, diamond, boron carbide, silicon carbide, aluminum, sapphire, and beryllium oxide (BeO)). The vacuum window 132 can further provide a sufficiently electrically conductive path to dissipate electric charge from the at least one x-ray generating material of the target 130 and/or the vacuum window 132. In certain implementations, the vacuum window 132 is configured to have an x-ray transmission such that more than 50% of the x-rays generated by the target 130 having energies greater than one-half the selected maximum focused electron energy are transmitted through the vacuum window 132.

In certain implementations, the first portion 122 of the aperture 120 comprises a solid, substantially planar slab or plate (see, e.g., FIGS. 2A-2B), while in certain other implementations, the first portion 122 is non-planar (e.g., curved). In certain implementations, at least 50% (e.g., at least 70%; at least 90%) of the first portion 122 is the at least one first atomic element. Examples of the at least one first atomic element of the first portion 122 include but are not limited to: molybdenum; tungsten.

In certain implementations, the hole 124 (e.g., orifice; slit) of the aperture 120 has a width in a direction substantially perpendicular to the electron beam 112 less than 5 millimeters (e.g., less than 4 millimeters; less than 2 millimeters; less than 1 millimeter). Various shapes of the perimeter of the hole 124 are compatible with certain implementations described herein (e.g., circular, oval, rectangular, square, polygonal, symmetric, asymmetric).

In certain implementations, at least 50% (e.g., at least 70%; at least 90%) of the second portion 126 is the at least one second atomic element. Examples of the at least one second atomic element include but are not limited to: carbon (e.g., the second portion 126 comprising a graphite layer, diamond, and/or polymer). The second portion 126 can be electrically conductive and in electrical communication to ground such that an electrical charge of the second portion 126 does not increase by virtue of being impinged by the electrons.

In certain implementations, the second portion 126 of the aperture 120 comprises at least one layer coated onto the at least one surface of the first portion 122. For example, the at least one layer can be coated on a single surface region of the first portion 122 (e.g., a surface region facing towards the electron beam source 110). For another example (see, e.g., FIG. 2A), the at least one layer can be coated on at least two surface regions of the first portion 122 (e.g., a surface region facing towards the electron beam source 110 and a surface region extending at least partly into the hole 124). For another example (see, e.g., FIG. 2B), the at least one layer can be coated on at least three surface regions of the first portion 122 (e.g., a surface region facing towards the electron beam source 110, a surface region extending at least partly into the hole 124, and a surface region facing away from the electron beam source 110). The second portion 126 on the surface region of the first portion 122 facing away from the electron beam source 110 can face towards the target 130 and can inhibit (e.g., reduce; prevent; block) secondary x-rays from being generated by backscattered electrons from the target 130 impinging the first portion 122.

The at least one layer of the second portion 126 can be configured to attenuate over 50% of the electron flux impinging the second portion 126 (e.g., blocking at least 50% of the electron flux impinging the second portion 126 from reaching the first portion 122). For example, the thickness of the at least one layer can be in a range of 50 microns to 300 microns, in a range of 50 microns to 100 microns; in a range of 100 microns to 300 microns; greater than 300 microns. For another example, the thickness of the at least one layer can be greater than or equal to a continuous slowing down approximation (CSDA) length of the mean electron energy of the electrons (e.g., in a range of 30 keV to 150 keV; in a range of 30 keV to 100 keV; in a range of 60 keV to 140 keV; in a range of 80 keV to 120 keV; in a range of 100 keV to 150 keV) in a impinging the second portion 126. Using the NIST ESTAR database of stopping power and range tables for electrons, a CSDA range for 150 keV electrons is $3.174 \times 10^{-2}$ g/cm$^2$, corresponding to a CSDA range or thickness for carbon of about 144 microns (e.g., $3.174 \times 10^{-2}$ g/cm$^2$ divided by a density of 2.2 g/cm$^3$).

Figure 3A:
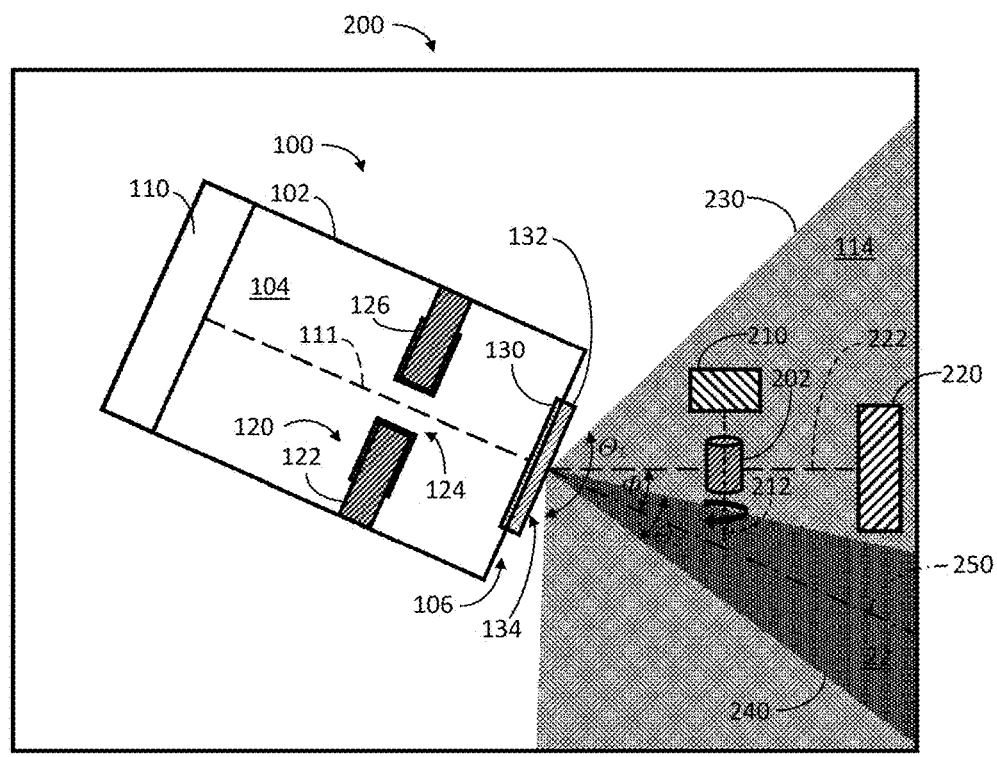
FIG. 3A schematically illustrates a cross-sectional view of another example of a transmission x-ray source in accordance with certain implementations described herein.

FIG. 3A schematically illustrates a cross-sectional view of another example of a transmission x-ray source 100 in accordance with certain implementations described herein. In certain implementations, the x-ray source 100 comprises an aperture 120 as described herein with regard to FIGS. 2A-2B, while in certain other implementations, the x-ray source 100 does not comprise an aperture 120. The example x-ray source 100 is shown in FIG. 3A as part of an x-ray tomography system 200 comprising a rotational stage 210 and at least one x-ray detector 220. The rotational stage 210 is configured to support and to controllably move a sample 202 (e.g., configured to have a sample 202 mounted thereon and configured to rotate the sample 202 about a rotation axis 212). As schematically illustrated by FIG. 3A, a central beam axis 222 can be defined by a straight line extending from an x-ray generating spot of the target 130, a portion of the sample 202, and a portion of the at least one x-ray detector 220 (e.g., the central beam axis 222 extending through the sample 202 to a center of an effective region of the at least one x-ray detector 220). In certain implementations, the x-ray tomography system 200 comprises additional elements (e.g., x-ray attenuators; x-ray blockers) configured to prevent x-rays that impinge other structures besides the sample 202 (e.g., the rotational stage 210) from reaching the at least one x-ray detector 220.

In certain implementations, the distance between the x-ray source 100 and the at least one x-ray detector 220 is less than 2 meters (e.g., less than 1.5 meters; less than 1 meter; less than 0.75 meter; less than 0.5 meter). In certain implementations, the x-ray tomography system 200 comprises multiple motors configured to move the x-ray source 100 and/or the at least one x-ray detector 220 (e.g., towards and away from the rotation axis 212) to controllably adjust a source-to-sample distance (e.g., distance between the outer surface 134 of the vacuum window 132 and the sample 202) and a sample-to-detector distance (e.g., distance between the sample 202 and an outer surface of the at least one x-ray detector 220 facing the sample 202).

In certain implementations, the x-ray source 100 is configured to generate a first diverging x-ray beam 230 comprising x-rays 140 from the target 130 (e.g., primary x-rays) and a second diverging x-ray beam 240 comprising x-rays 22 generated by the electrons impinging the aperture 120. Both the first x-ray beam 230 and the second x-ray beam 240 are centered about an x-ray axis 250 (e.g., substantially perpendicular to the target 130 and/or to an outer surface 134 of the vacuum window 132; substantially parallel to a propagation axis 111 of the electron beam 112; substantially colinear with the propagation axis 111). At least 70% (e.g., at least 80%; at least 90%; at least 95%) of the x-rays 114 of the first diverging x-ray beam 230 are within a first cone angle $\Theta_1$ (e.g., symmetric about the x-ray axis 250) greater than or equal to 130 degrees (e.g., greater than or equal to 150 degrees; greater than or equal to 175 degrees; greater than or equal to 180 degrees). At least 70% (e.g., at least 80%; at least 90%; at least 95%) of the x-rays 22 of the second diverging x-ray beam 240 are within a second cone angle $\Theta_2$ (e.g., symmetric about the x-ray axis 250) less than the first cone angle $\Theta_1$ (e.g., the second diverging x-ray beam 240 is more collimated than is the first diverging x-ray beam 230; see, e.g., FIG. 3A). For example, the second cone angle $\Theta_2$ can be: in a range of 2 degrees to 30 degrees; in a range of 2 degrees to 10 degrees; in a range of 6 degrees to 10 degrees; in a range of 10 degrees to 20 degrees; in a range of 20 degrees to 30 degrees.

In certain implementations, the x-ray source 100 and/or other portions of the x-ray tomography system 200 (e.g., the sample 202, rotational stage 210, and at least one x-ray detector 220) are configured to be moved relative to one another to tilt the x-ray axis 250 to have a non-zero tilt angle $\Phi$ relative to the central beam axis 222. The non-zero tilt angle $\Phi$ can be in a range of $0.5 \cdot \Theta_2$ to $0.5 \cdot \Theta_1$ (e.g., in a range of 5 degrees to 30 degrees; greater than 6 degrees; in a range of 10 degrees to 20 degrees; 15 degrees).

For example, the x-ray source 100 can be mounted to a translational and/or rotational stage configured to adjust the tilt angle $\Phi$ and/or the distance between the outer surface 134 of the vacuum window 132 and the at least one x-ray detector 220. For another example, the x-ray source 100 can remain stationary while the sample 202, rotational stage 210, and at least one x-ray detector 220 are moved to create a desired tilt angle Φ (e.g., using at least one translational and/or rotational stage). While FIG. 3A shows the x-ray source 100 tilted upwards (e.g., the x-ray axis 250 is below the central beam axis 222) with the rotation axis 212 in the plane that contains the central beam axis 222 and the x-ray axis 250, alternatively, the x-ray source 100 can be tilted downwards (e.g., the x-ray axis 250 is above the central beam axis 222) with the rotation axis 212 in the plane that contains the central beam axis 222 and the x-ray axis 250. In certain other implementations, the x-ray source 100 is tilted in another direction with the rotation axis 212 non-planar with the plane that contains the central beam axis 222 and the x-ray axis 250.

In certain implementations, the x-ray source 100 is tilted such that at least 70% (e.g., at least 80%; at least 90%; at least 95%; 100%) of the secondary x-rays (e.g., x-rays 22) are not incident on a region of the at least one x-ray detector 220 (e.g., a central region) configured to receive x-rays 114 from the sample 202 (e.g., the x-rays 22 are not incident on the at least one x-ray detector 220). For example, the x-ray source 100 can be tilted relative to the central beam axis 222 such that the tilt angle Φ between the central beam axis 222 and the x-ray axis 250 can be expressed as:

$$\Phi \geq 0.5 \cdot (\Theta_D + \Theta_2)$$

where $\Theta_D$ is an angle subtended by the region of the at least one x-ray detector 220 (e.g., symmetric about the central beam axis 222) and $\Theta_2$ is the second cone angle of the second diverging x-ray beam 240. Using this relationship, for $\Theta_D$ equal to 40 degrees and $\Theta_2$ equal to 8 degrees, the tilt angle Φ can be greater than or equal to 24 degrees.

In certain implementations, the x-ray source 100 is tilted such that at least 70% (e.g., at least 80%; at least 90%; at least 95%; at least 99%; 100%) of the secondary x-rays (e.g., x-rays 22) are not incident on a central one-third region of the two-dimensional area of the at least one x-ray detector 220. For example, the x-ray source 100 can be tilted relative to the central beam axis 222 such that the tilt angle Φ between the central beam axis 222 and the x-ray axis 250 can be expressed as:

$$\Phi \geq 0.5 \cdot [(1/3 \cdot \Theta_D) + \Theta_2].$$

Using this relationship, for $\Theta_D$ equal to 40 degrees and $\Theta_2$ equal to 8 degrees, the tilt angle Φ can be greater than or equal to about 21.3 degrees. In certain such implementations, the effects of the secondary x-rays can be mitigated from the central region-of-interest (ROI) of the x-ray image but are not fully removed. The effects of the secondary x-rays can be further reduced by stitching with additional data and/or post-processing.

In certain implementations, the portion of the x-ray source 100 closest to the sample 202 (e.g., which can be referred to as the snout 106 of the x-ray source 100) and containing the vacuum window 132 is shaped to facilitate tilting of the x-ray source 100 relative to the central beam axis 222. For example, for relatively small samples 202 (see, e.g., FIG. 3A), the snout 106 can be substantially flat.

Figure 3B:
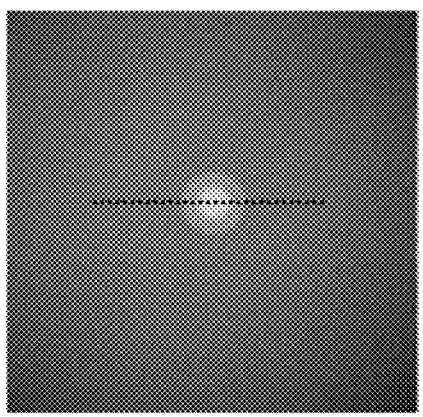
FIGS. 3B and 3C show an x-ray image and an x-ray lineout, respectively, of a portion of an example first diverging x-ray beam and an example second diverging x-ray beam 240 in accordance with certain implementations described herein.
Figure 3C:
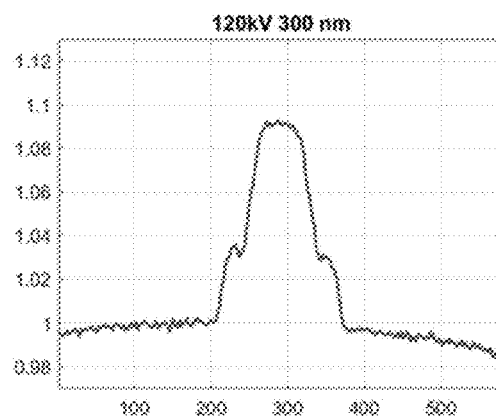

FIGS. 3B and 3C show an x-ray image and an x-ray lineout, respectively, of a portion of an example first diverging x-ray beam 230 and an example second diverging x-ray beam 240 in accordance with certain implementations described herein. The x-ray lineout is a plot of the x-ray intensity along a lin106e (e.g., dotted line in FIG. 3B) substantially perpendicular to the x-ray axis 250. The x-ray image and x-ray lineout were measured with the x-ray source 100 operating with a 120 kV electron beam 112 and a 300-nanometer spot size on the target 130, and with the x-ray source 100 and the at least one x-ray detector 220 aligned with one another (e.g., the central beam axis 222 and x-ray axis 250 coincident with one another) without a sample 202 between the x-ray source 100 and the at least one x-ray detector 220. As shown in FIG. 3B, the x-ray image resembles a central bright circular portion (e.g., due to the second diverging x-ray beam 240) encircled by a concentric circular ring portion (e.g., due to the first diverging x-ray beam 230) overlaying a non-zero intensity distribution. As shown in FIG. 3C, the x-ray lineout resembles a "top-hat" shape which can be used to measure the second cone angle ( ). For example, the diameter of the "top hat" shape (e.g., the diameter at the full-width-at-half-maximum or FWHM; the diameter at which the intensity is greater than 5% above the underlying non-zero intensity distribution) can be divided by the distance between the x-ray source 100 (e.g., the outer surface 134 of the x-ray window 132) and the at least one x-ray detector 220 to calculate the second cone angle $\Phi_2$. Using the example values of a diameter of 17 millimeters and a distance of 220 millimeters, the second cone angle $\Phi_2$ is approximately equal to 7.7 degrees.

In certain implementations, the portion of the x-ray source 100 closest to the sample 202 (e.g., which can be referred to as the snout 106 of the x-ray source 100) and containing the vacuum window 132 is shaped to facilitate tilting of the x-ray source 100 relative to the central beam axis 222. For example, for relatively small samples 202 (see, e.g., FIG. 3A) and/or samples 202 relatively distant from the x-ray source 100, the snout 106 does not appreciably inhibit tilting of the x-ray source 100, and the snout 106 can be substantially flat. However, using an x-ray source 100 with such a substantially flat snout 106 could inhibit tilting the x-ray source 100 with relatively large samples 202 and/or samples 202 that are relatively close to the x-ray source 100, thereby decreasing throughput and/or x-ray flux to the sample 202 and/or setting a maximum size of the sample 202.

Figure 3D:
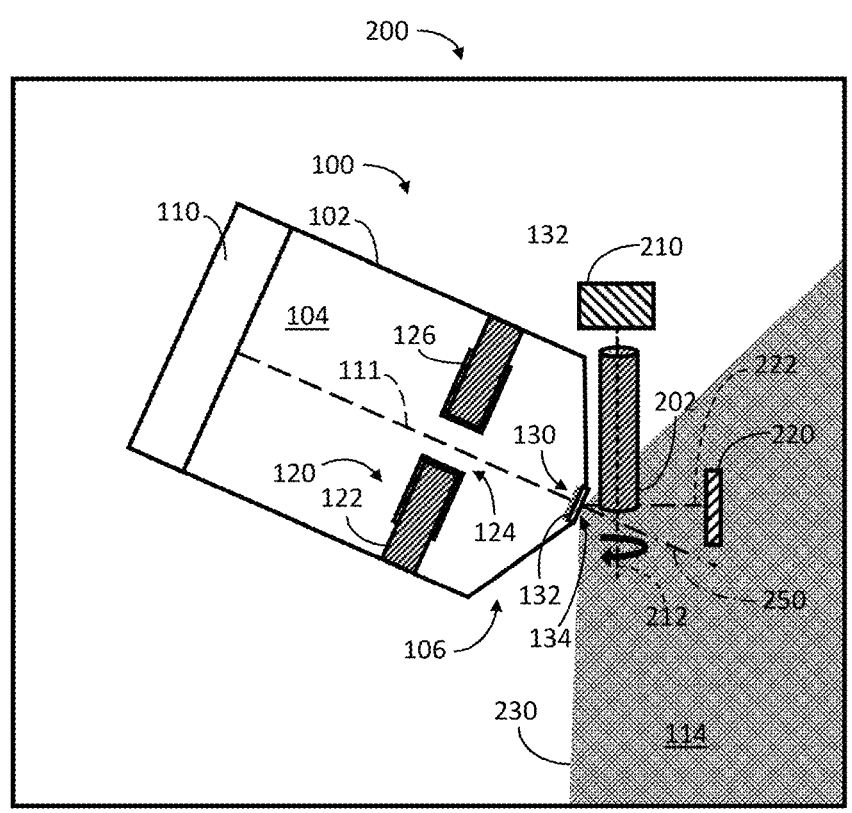
FIG. 3D schematically illustrates an example x-ray source with a substantially conical snout in accordance with certain implementations described herein.

FIG. 3D schematically illustrates an example x-ray source 100 with a substantially conical snout 106 in accordance with certain implementations described herein. The snout 106 comprises the vacuum window 132 and the portions of the vacuum chamber 102 to which the vacuum window 132 is affixed. In certain such implementations, the x-ray source 100 can be tilted (e.g., such that a portion of the conical snout 106 is substantially parallel to the sample 202). For example, as shown in FIG. 3D, the sample 202 can comprise a tall cylinder placed close (e.g., less than 10 millimeters; less than 5 millimeters; less than 2 millimeters; less than 1 millimeter) to the outer surface 134 of the vacuum window 132.

In certain implementations, the rotational stage 210 comprises a rotary stage (e.g., mechanical rotary stage; air-bearing rotary stage) and a three-axis (e.g., three orthogonal axes) translational positioning stage on the rotary stage. The rotary stage can be substantially stationary (e.g., affixed to a large granite slab). The rotary stage can have a runout of less than 150 nanometers (e.g., less than 100 nanometers; less than 50 nanometers) and the three-axis translational positioning stage can be configured to position the sample 202 relative to the center beam axis 222 and relative to the outer surface 134 of the vacuum window 132. The three-axis translational positioning stage can be configured to translate the sample 202 at least 40 millimeters (e.g., at least 50 millimeters; at least 100 millimeters) along each of the three axes.

In certain implementations, while submicron resolution imaging can be affected by non-zero runout (e.g., radial runout; axial runout) of the rotary stage, the rotations are sufficiently systematic such that calibration can be used to align tomography projections to correct for the runout and to achieve submicron (e.g., less than 1 micron; 0.5 micron; 0.3 micron) imaging. For example, a substantially spherical calibration sample (e.g., solder ball; ruby ball) can be placed at the rotation center at different locations along a y-axis (e.g., the rotation axis 212; perpendicular to a horizontal z-axis). The center-of-mass of the calibration sample can be measured at various locations along the y-axis and such measurements can be used to centershift the projections before reconstructing the tomography.

In certain implementations in which the x-ray source 100 is tilted and the rotation axis 212, central beam axis 222, and x-ray axis 250 are coplanar with one another (see, e.g., FIG. 3D), the sample 202 is movable in a range of positions in a direction substantially perpendicular to the central beam axis 222 (e.g., along the rotation axis 212) such that the sample 202 does not substantially intersect the second diverging x-ray beam 240 (e.g., which is centered about the x-ray axis 250). Due to the non-zero tilt angle Φ, this range of positions is wider for larger source-to-sample distances (e.g., distances between the outer surface 134 of the vacuum window 132 and the sample 202) than for smaller source-to-sample distances. In certain implementations, the three-axis translational positioning stage of the rotational stage 210 is configured to position the sample 202 such that the x-rays transmitted through a region-of-interest (ROI) of the sample 202 (e.g. the ROI imaged by the at least one x-ray detector 220) substantially comprise primary x-rays 114 (e.g., the primary x-rays 114 are more than 70%, more than 80%, more than 90%, more than 95%, or more than 99% of the x-rays transmitted through the ROI) for more than 50% of the source-to-sample distances.

Figure 4A:
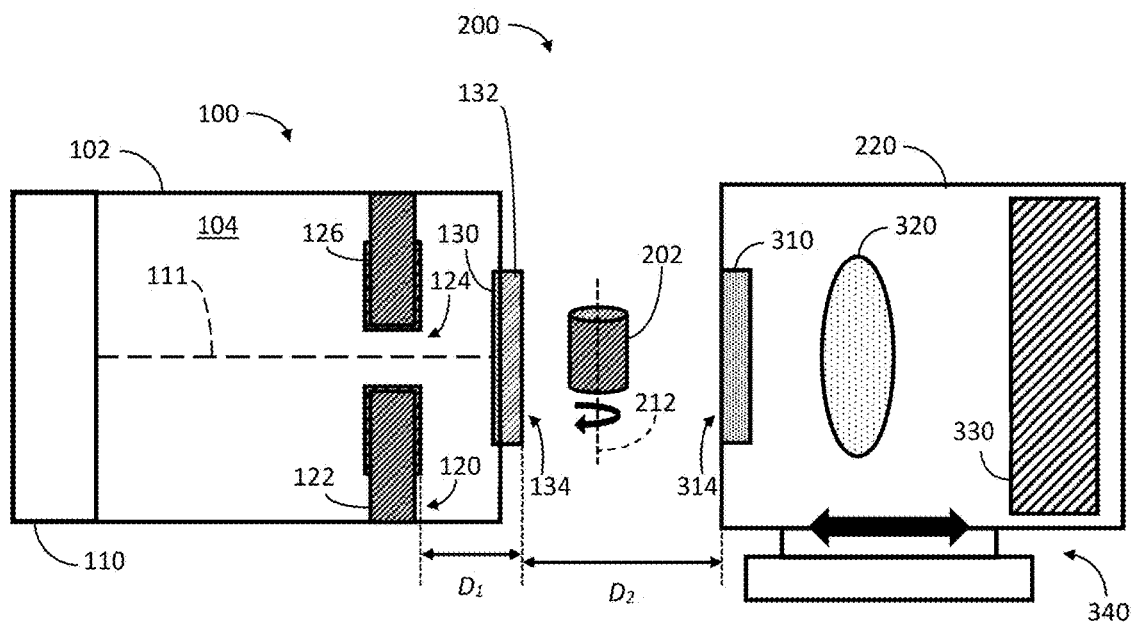
FIGS. 4A-4B schematically illustrate cross-sectional views of two examples of a transmission x-ray source in accordance with certain implementations described herein.
Figure 4B:
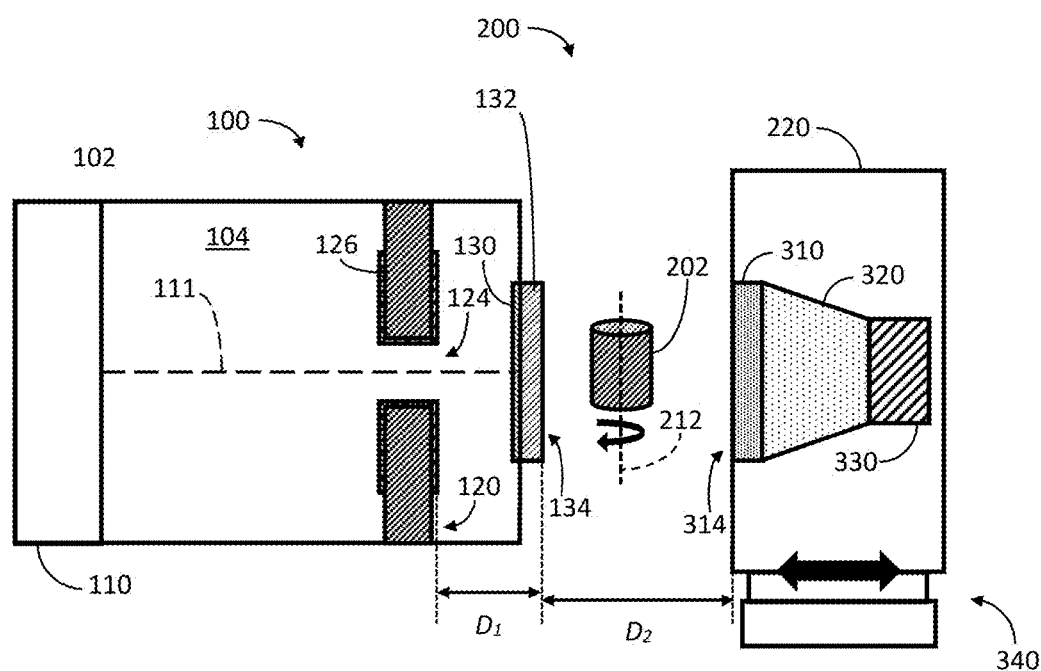

FIGS. 4A-4B schematically illustrate cross-sectional views of two examples of a transmission x-ray source 100 in accordance with certain implementations described herein. In certain implementations, the x-ray source 100 comprises an aperture 120 as described herein with regard to FIGS. 2A-2B, while in certain other implementations, the x-ray source 100 does not comprise an aperture 120. The aperture 120 can be a first distance $D_1$ from the vacuum window 132 (e.g., distance between a surface of the aperture 120 facing the target 130 and the outer surface 134 of the vacuum window 132 facing away from the target 130). For example, the first distance $D_1$ can be greater than 4 millimeters (e.g., in a range of 4 millimeters to 7 millimeters; greater than 7 millimeters; in a range of 5 millimeters to 20 millimeters; in a range of 20 millimeters to 50 millimeters; greater than 50 millimeters). The first distance $D_1$ can be sufficiently large to reduce (e.g., minimize) the flux of secondary x-rays 22 emitted from the x-ray source 100.

In certain implementations, the x-ray source 100 is part of an x-ray tomography system 200 comprising a rotational stage 210 and at least one x-ray detector 220, the rotational stage 210 configured to have a sample 202 mounted thereon and configured to rotate the sample 202 about a rotation axis 212. While the x-ray tomography systems 200 of FIGS. 4A-4B have the central beam axis 222 coincident with the x-ray axis 250 (e.g., the tilt angle Φ is substantially equal to zero), in certain other implementations, the x-ray source 100 and/or other portions of the x-ray tomography system 200 (e.g., the sample 202, rotational stage 210, and at least one x-ray detector 220) are configured to be moved relative to one another to tilt the x-ray axis 250 to have a non-zero angle Φ relative to the central beam axis 222, as discussed herein with regard to FIGS. 3A-3C. In certain implementations, the x-ray tomography system 200 comprises additional elements (e.g., x-ray attenuators; x-ray blockers) configured to prevent x-rays that impinge other structures besides the sample 202 (e.g., the rotational stage 210) from reaching the at least one x-ray detector 220.

In certain implementations, as shown in FIGS. 4A-4B, the at least one x-ray detector 220 comprises at least one scintillator 310, at least one optical element 320, and at least one visible light sensor 330. The at least one scintillator 310 (e.g., phosphor screen) has an outer surface 314 and is configured to receive x-rays from the sample 202 and to generate visible light in response to the received x-rays. In certain implementations, the phosphor screen comprises a single crystal material. In certain implementations, the phosphor screen comprises at least one material of the group consisting of: cesium iodide (e.g., CsI(Tl)), gadolinium oxysulfide (e.g., $Gd_2O_2S$; GadOx), gadolinium aluminum gallium garnet (GAGG), and yttrium aluminum garnet (YAG). In certain implementations, the phosphor screen can have a thickness in a direction substantially parallel to the central beam axis 222 that is less than or equal to 100 microns.

The at least one optical element 320 (e.g., an optical assembly) is configured to receive the visible light from the at least one scintillator 310 and to allow the visible light to propagate to the at least one visible light sensor 330. For example, as shown in FIG. 4A, the at least one optical element 320 comprises at least one lens (e.g., an objective lens), and as shown in FIG. 4B, the at least one optical element 320 comprises at least one optical fiber (e.g., fiber optic conduit). The at least one lens can comprise a high numerical aperture objective lens (e.g., similar to those used in visible light microscopes), with a magnification greater than or equal to 4× (e.g., in a range of 5× to 10×; in a range of 10× to 20×). The fiber optic conduit can be tapered and can produce a magnification greater than or equal to 0.3× (e.g., 0.3×; 0.5×; 1×; 1.5×; 2×; 3×). In certain implementations, the phosphor screen can have a thickness in a direction substantially parallel to the central beam axis 222 that is less than or equal to 5 times a depth-of-field of the at least one lens (e.g., less than or equal to 3 times the depth-of-field; less than or equal to 2 times the depth-of-field; less than or equal to the depth-of-field). In certain implementations, the phosphor screen of the at least one scintillator 310 has a thickness less than 200 microns (e.g., less than 150 microns; less than 100 microns; less than or equal to 50 microns).

The at least one visible light sensor 330 (e.g., spatially-resolving sensor; charge-coupled device (CCD) image sensor; complementary metal-oxide-semiconductor (CMOS) image sensor) is configured to respond to the visible light by generating electrical signals indicative of the x-rays received by the at least one x-ray detector 220 from the sample 202. The at least one visible light sensor 330 can have pixel sizes (e.g., width or diameter) less than 20 microns (e.g., less than 18 microns; less than 10 microns; in a range of 1 micron to 5 microns; less than 1 micron). Example visible light sensors 330 compatible with certain implementations described herein are available from Sony Corp. of Tokyo, Japan and GPixel Microelectronics Inc. of Changchun, China.

In certain implementations, the at least one visible light sensor 330 has pixel sizes greater than 10 microns, and the at least one scintillator 310, the at least one optical element 320, and the at least one visible light sensor 330 are arranged for a visible light magnification that produces an effective pixel size less than 20 microns (e.g., less than 18 microns;

less than 10 microns; in a range of 1 micron to 5 microns; in a range of 2 microns to 5 microns; less than 5 microns; in a range of 1 micron to 2 microns; less than 1 micron; less than 0.5 micron; less than 0.3 micron; less than 0.15 micron). While FIGS. 4A-4B show the at least one visible light sensor 330 having a front face that is substantially parallel to the at least one scintillator 310, in certain other implementations, the front face of the at least one visible light sensor 330 can be at a non-zero angle (e.g., substantially perpendicular) to the at least one scintillator 310 (e.g., with the at least one optical element 320 comprising a 45-degree mirror).

In certain implementations, as shown in FIGS. 4A-4B, the at least one x-ray detector 220 is in mechanical communication with (e.g., affixed or mounted to) at least one controllable (e.g., motorized) translation stage 340 configured to controllably adjust a second distance $D_2$ (e.g., source-to-detector distance) between the vacuum window 132 and the at least one x-ray detector 220. For example, the second distance $D_2$ can be a distance between the outer surface 134 of the vacuum window 132 and an outer surface of the at least one x-ray detector 220 facing the sample 202 (e.g., the outer surface 314 of the at least one scintillator 310). In certain implementations, the at least one x-ray detector 220 can be positioned close to the sample 202. For example, the second distance $D_2$ can be less than 20 millimeters (e.g., less than 10 millimeters; less than 5 millimeters). Such second distances $D_2$ are smaller than the sample-to-detector distances used in conventional systems. For example, a conventional flat panel detector with 50-micron pixels can have a second distance $D_2$ of about 210 millimeters for a sample placed 3 millimeters from the x-ray source to achieve an imaging pixel resolution of about 0.7 micron. In contrast, an example x-ray detector 220 in accordance with certain implementations described herein having an effective pixel size of 1.7 microns can be used with a second distance $D_2$ of 4.3 millimeters (e.g., a reduction by almost a factor of 50) to produce the same imaging pixel resolution of about 0.7 micron from a sample 202 placed 3 millimeters from the x-ray source 100.

By utilizing smaller second distances $D_2$, certain implementations described herein can increase the number of primary x-rays 114 compared to the number of secondary x-rays 22 reaching the at least one x-ray detector 220. The fraction of the primary x-rays 114 generated by the target 130 that reach the outer surface 314 of the at least one scintillator 310 is inversely proportional to the square of the distance between the target 130 and the outer surface 314 of the at least one scintillator 310, which can be approximated to be substantially equal to the second distance $D_2$ (e.g., source-to-detector distance; distance between the outer surface 134 of the vacuum window 132 and an outer surface 314 of the at least one scintillator 310). In addition, the fraction of the secondary x-rays 22 generated by the aperture 120 that reach the outer surface 314 of the at least one scintillator 310 is inversely proportional to the square of the distance between the aperture 120 and the outer surface 314 of the at least one scintillator 310, which can be approximated to be substantially equal to the first distance $D_1$ plus the second distance $D_2$. Using these approximations, a suppression ratio R of secondary x-rays 22 to primary x-rays 114 reaching the outer surface 314 of the at least one scintillator 310 can be expressed as: $R=D_2^2/(D_1+D_2)^2$. In certain implementations, the suppression ratio R is less than 0.2 (e.g., less than 0.1; less than 0.01; less than 0.005; less than 0.002; less than 0.001). For example, with a first distance $D_1$ of 10 millimeters and a second distance $D_2$ of 4.3 millimeters, the suppression ratio R is approximately equal to 0.09, and can be used with the at least one x-ray detector 220 having an effective pixel width or diameter less than 10 microns (e.g., in a range of 1 micron to 5 microns; less than 5 microns; less than 1 micron). In comparison, the suppression ratio R for a conventional flat panel detector with a second distance $D_2$ of 220 millimeters would be 0.915.

In certain implementations, the target 130 is microstructural and comprises a plurality of discrete (e.g., separate; spaced from one another) regions of metal. For example, the electron beam 112 can be deflected between at least one region of the target 130 comprising at least one x-ray generating material and at least one non-target region with a low atomic number material (e.g., diamond; beryllium), the electron beam deflection can be used for "beam blanking" and can be used in combination with a secondary-to-primary suppression approach by using a small pixel detector placed at a small $D_2$ value.

In certain implementations, the at least one x-ray detector 220 comprises multiple x-ray detectors in mechanical communication with a translational and/or rotational stage configured to position a selected one of the multiple x-ray detectors 220 into position to receive x-rays from the sample 202. For example, a first x-ray detector 220 can have a first effective pixel size less than 10 microns (e.g., less than 5 microns) and a second x-ray detector (e.g., a conventional flat panel detector) can have a second effective pixel size greater than 40 microns (e.g., in a range of 50 microns to 100 microns) and/or a maximum field-of-view (FOV) greater than 100 millimeters in at least one lateral direction. The first x-ray detector 220 can be used for high resolution imaging at small $D_2$ values to suppress the contribution of the secondary x-ray beam 240. The second x-ray detector can be used for coarser resolution imaging with larger FOV (e.g., with a movable external aperture positioned between the x-ray source 100 and the sample 202).

Although commonly used terms are used to describe the systems and methods of certain implementations for ease of understanding, these terms are used herein to have their broadest reasonable interpretations. Although various aspects of the disclosure are described with regard to illustrative examples and implementations, the disclosed examples and implementations should not be construed as limiting. Conditional language, such as "can," "could," "might," or "may," unless specifically stated otherwise, or otherwise understood within the context as used, is generally intended to convey that certain implementations include, while other implementations do not include, certain features, elements, and/or steps. Thus, such conditional language is not generally intended to imply that features, elements, and/or steps are in any way required for one or more implementations. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

Conjunctive language such as the phrase "at least one of X, Y, and Z," unless specifically stated otherwise, is to be understood within the context used in general to convey that an item, term, etc. may be either X, Y, or Z. Thus, such conjunctive language is not generally intended to imply that certain implementations require the presence of at least one of X, at least one of Y, and at least one of Z.

Language of degree, as used herein, such as the terms "approximately," "about," "generally," and "substantially,"

represent a value, amount, or characteristic close to the stated value, amount, or characteristic that still performs a desired function or achieves a desired result. For example, the terms "approximately," "about," "generally," and "substantially" may refer to an amount that is within ±10% of, within ±5% of, within ±2% of, within ±1% of, or within ±0.1% of the stated amount. As another example, the terms "generally parallel" and "substantially parallel" refer to a value, amount, or characteristic that departs from exactly parallel by ±10 degrees, by ±5 degrees, by ±2 degrees, by ±1 degree, or by ±0.1 degree, and the terms "generally perpendicular" and "substantially perpendicular" refer to a value, amount, or characteristic that departs from exactly perpendicular by ±10 degrees, by ±5 degrees, by ±2 degrees, by #1 degree, or by ±0.1 degree. The ranges disclosed herein also encompass any and all overlap, sub-ranges, and combinations thereof. Language such as "up to," "at least," "greater than," less than," "between," and the like includes the number recited. As used herein, the meaning of "a," "an," and "said" includes plural reference unless the context clearly dictates otherwise. While the structures and/or methods are discussed herein in terms of elements labeled by ordinal adjectives (e.g., first, second, etc.), the ordinal adjectives are used merely as labels to distinguish one element from another, and the ordinal adjectives are not used to denote an order of these elements or of their use.

Various configurations have been described above. It is to be appreciated that the implementations disclosed herein are not mutually exclusive and may be combined with one another in various arrangements. Although this invention has been described with reference to these specific configurations, the descriptions are intended to be illustrative of the invention and are not intended to be limiting. Various modifications and applications may occur to those skilled in the art without departing from the true spirit and scope of the invention. Thus, for example, in any method or process disclosed herein, the acts or operations making up the method/process may be performed in any suitable sequence and are not necessarily limited to any particular disclosed sequence. Features or elements from various implementations and examples discussed above may be combined with one another to produce alternative configurations compatible with implementations disclosed herein. Various aspects and advantages of the implementations have been described where appropriate. It is to be understood that not necessarily all such aspects or advantages may be achieved in accordance with any particular implementation. Thus, for example, it should be recognized that the various implementations may be carried out in a manner that achieves or optimizes one advantage or group of advantages as taught herein without necessarily achieving other aspects or advantages as may be taught or suggested herein.

What is claimed is:

1. An apparatus comprising:
    a transmission x-ray source comprising:
        a window comprising a target layer of at least one x-ray generating material configured to generate x-rays in response to bombardment by electrons; and
        an internal aperture configured to allow a first portion of an electron beam from an electron beam source to bombard the target layer and to block a second portion of the electron beam from bombarding the target layer, the first portion of the electron beam having a full-width-at-half-maximum width at the target layer less than or equal to 1 micron, the window spaced from the internal aperture by a first distance $D_1$; and
    an x-ray detector system comprising:
        a scintillator configured to receive x-rays from the x-ray source that have propagated through a sample and to respond to the received x-rays by generating visible light;
        an optical assembly configured to receive the visible light from the scintillator;
        at least one image sensor configured to receive and respond to the visible light from the optical assembly by generating electrical signals; and
        a motorized stage configured to controllably adjust a position of the scintillator such that the scintillator is spaced from the window by a second distance $D_2$, wherein $D_2^2/(D_1+D_2)^2$ is less than 0.2.

2. The apparatus of claim 1, wherein the motorized stage comprises a translation stage affixed to the at least one x-ray detector.

3. The apparatus of claim 1, wherein the first distance $D_1$ is greater than 4 millimeters.

4. The apparatus of claim 3, wherein the effective pixel size of the x-ray detector system is less than 20 microns.

5. The apparatus of claim 1, wherein the electron beam has a full-width-at-half-maximum width at the target layer less than 0.5 micron.

6. An apparatus comprising:
    an x-ray source comprising:
        an electron beam source configured to generate an electron beam;
        at least one aperture configured to allow a first portion of the electron beam to propagate through the at least one aperture and to block a second portion of the electron beam from propagating through the at least one aperture;
        at least one target comprising at least one x-ray generating material, the at least one x-ray generating material configured to generate a first diverging x-ray beam in response to bombardment by the first portion of the electron beam, the at least one aperture configured to generate a second diverging x-ray beam in response to bombardment by the second portion of the electron beam and/or by electrons backscattered from the at least one target; and
        a window configured to emit the first x-ray beam and the second x-ray beam, both the first x-ray beam and the second x-ray beam substantially centered on an x-ray axis that is substantially perpendicular to an outer surface of the window;
    a sample stage configured to support and controllably move a sample; and
    at least one x-ray detector configured to receive x-rays of the first x-ray beam transmitted from the x-ray source and through a region-of-interest of the sample along a central beam axis, the central beam axis and the x-ray axis having an angle Φ greater than or equal to 6 degrees therebetween.

7. The apparatus of claim 6, wherein the electron beam source comprises a cathode configured to emit electrons and electron optics configured to direct the electrons into the electron beam and to accelerate the electron beam towards the at least one target using accelerating voltages in a range of 30 kVp to 160 kVp.

8. The apparatus of claim 6, wherein the electron beam has a full-width-at-half-maximum spot diameter at the at least one target less than 2 microns.

9. The apparatus of claim 6, wherein a surface of the aperture facing the at least one target is spaced from an outer surface of the window facing away from the at least one target by a distance $D_1$ greater than 4 millimeters.

10. The apparatus of claim 9, further comprising at least one translation stage affixed to the at least one x-ray detector and configured to controllably adjust a second distance $D_2$ between the outer surface of the window and an outer surface of the at least one detector facing the sample, the second distance $D_2$ less than 20 millimeters.

11. The apparatus of claim 10, wherein $D_2^2/(D_1+D_2)^2$ is less than 0.2.

12. The apparatus of claim 6, wherein the window comprises diamond and the at least one x-ray generating material of the at least one target comprises at least one metal layer on the window.

13. The apparatus of claim 6, wherein the at least one x-ray detector comprises a first x-ray detector comprising:
   at least one scintillator configured to receive x-rays from the sample and to generate visible light in response to the received x-rays;
   at least one optical element configured to receive the visible light from the at least one scintillator; and
   at least one visible light sensor configured to receive the visible light from the at least one optical element.

14. The apparatus of claim 13, wherein the at least one optical element comprises at least one lens and has a magnification greater than or equal to 4×.

15. The apparatus of claim 13, wherein the at least one optical element comprises at least one tapered fiber optic conduit configured to produce a magnification greater than or equal to 1×.

16. The apparatus of claim 13, wherein the at least one visible light sensor comprises at least one spatially-resolving image sensor having pixel widths less than 20 microns.

17. The apparatus of claim 13, wherein the at least one visible light sensor comprises at least one spatially-resolving image sensor having effective pixel widths less than 5 microns.

18. The apparatus of claim 13, wherein the at least one x-ray detector further comprises a second x-ray detector comprising a flat panel detector comprising pixels with an effective pixel width greater than 40 millimeters, the first and second x-ray detectors in mechanical communication with a translational and/or rotational stage configured to position a selected one of the first and second x-ray detectors into position to receive x-rays from the sample.

19. The apparatus of claim 6, wherein the angle $\Phi$ is in a range 10 degrees to 20 degrees.

20. The apparatus of claim 6, wherein the sample stage comprises an air-bearing rotary stage.

21. An apparatus comprising:
   a transmission x-ray source configured to generate a primary x-ray beam having a first cone angle $\Theta_1$ and a secondary x-ray beam having a second cone angle $\Theta_2$ less than the first cone angle $\Theta_1$, both the primary x-ray beam and the secondary x-ray beam diverging and symmetric about an x-ray axis;
   a sample stage configured to support and controllably move a sample; and
   at least one x-ray detector having a region configured to receive x-rays transmitted from the transmission x-ray source and through a region-of-interest of the sample along a beam axis at a non-zero angle $\Phi$ relative to the x-ray axis, the at least one x-ray detector configured to generate electrical signals indicative of the x-rays received at the region.

22. The apparatus of claim 21, wherein the first cone angle $\Theta_1$ is greater than or equal to 130 degrees and the second cone angle $\Theta_2$ is in a range of 2 degrees to 30 degrees.

23. The apparatus of claim 21, wherein the non-zero angle $\Phi$ is in a range of $0.5 \cdot \Theta_2$ to $0.5 \cdot \Theta_1$.

24. The apparatus of claim 21, wherein at least 70% of the secondary x-ray beam is not incident on the region of the at least one x-ray detector.

25. The apparatus of claim 21, wherein the non-zero angle $\Phi$ is greater than or equal to $0.5 \cdot (\Theta_D + \Theta_2)$, where $\Theta_D$ is an angle subtended by the region of the at least one x-ray detector.

* * * * *

UNITED STATES PATENT AND TRADEMARK OFFICE
CERTIFICATE OF CORRECTION

PATENT NO. : 12,181,423 B1
APPLICATION NO. : 18/406851
DATED : December 31, 2024
INVENTOR(S) : Sylvia Jia Yun Lewis It is certified that error appears in the above-identified patent and that said Letters Patent is hereby corrected as shown below:

In the Specification

In Column 10, Line 15, delete "( ). For example," and insert --$\Theta_2$. For example,--.

In Column 10, Line 22, delete "angle $\Phi_2$. Using" and insert --angle $\Theta_2$. Using--.

In Column 10, Line 24, delete "angle $\Phi_2$ is" and insert --angle $\Theta_2$ is--.

In Column 15, Line 14, delete "degrees, by #1" and insert --degrees, by ±1--.

Signed and Sealed this
Eighteenth Day of March, 2025

Coke Morgan Stewart
*Acting Director of the United States Patent and Trademark Office*